US012307977B2

(12) United States Patent
Sano

(10) Patent No.: US 12,307,977 B2
(45) Date of Patent: May 20, 2025

(54) PIXEL CIRCUIT, DISPLAY DEVICE, AND METHOD OF DRIVING DISPLAY DEVICE

(71) Applicant: Sharp Display Technology Corporation, Kameyama (JP)

(72) Inventor: Masahito Sano, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/726,045

(22) PCT Filed: Apr. 28, 2022

(86) PCT No.: PCT/JP2022/019265
§ 371 (c)(1),
(2) Date: Jul. 1, 2024

(87) PCT Pub. No.: WO2023/209943
PCT Pub. Date: Nov. 2, 2023

(65) Prior Publication Data

US 2025/0061861 A1 Feb. 20, 2025

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0819* (2013.01); *G09G 2300/0861* (2013.01); *G09G 2310/061* (2013.01); *G09G 2320/0233* (2013.01); *G09G 2320/0247* (2013.01); *G09G 2320/045* (2013.01); *G09G 2330/021* (2013.01); *G09G 2340/0435* (2013.01)

(58) Field of Classification Search
CPC ......... G09G 3/3233; G09G 2300/0819; G09G 2300/0861; G09G 2300/0842
See application file for complete search history.

(56) References Cited

U.S. PATENT DOCUMENTS

| | | | | |
|---|---|---|---|---|
| 2017/0249900 | A1* | 8/2017 | Xiang | G09G 3/3291 |
| 2020/0118487 | A1 | 4/2020 | Kim et al. | |
| 2020/0243017 | A1 | 7/2020 | Lee | |
| 2022/0114948 | A1* | 4/2022 | Xuan | G09G 3/32 |
| 2022/0375408 | A1* | 11/2022 | Dong | G09G 3/3241 |
| 2023/0222968 | A1* | 7/2023 | Li | H10D 86/60 345/204 |
| 2023/0298522 | A1* | 9/2023 | Kobayashi | G09G 3/3233 345/76 |
| 2024/0304144 | A1* | 9/2024 | Sano | G09G 3/3291 |
| 2024/0355287 | A1* | 10/2024 | Tanaka | G09G 3/3233 |

* cited by examiner

*Primary Examiner* — Van N Chow
(74) *Attorney, Agent, or Firm* — Keating & Bennett, LLP

(57) ABSTRACT

Regarding a display device that uses display elements driven by current, occurrence of flicker upon pause driving is suppressed while an increase in power consumption is suppressed. In a period, during which supply of a drive current to an organic EL element is stopped, in a refresh frame period (RF) included in a driving period, before a writing period (14) during which a data voltage is provided to the control terminal of the drive transistor, a reset circuit provided in a pixel circuit provides an off-voltage that brings a drive transistor into off state to a control terminal of the drive transistor, and then provides an initialization voltage that brings the drive transistor into on state to the control terminal of the drive transistor.

20 Claims, 29 Drawing Sheets

PIXEL CIRCUIT, DISPLAY DEVICE, AND METHOD OF DRIVING DISPLAY DEVICE

TECHNICAL FIELD

The following disclosure relates to a display device, and more specifically to a display device including pixel circuits each including a display element driven by current, such as an organic EL element, and a method of driving the display device.

BACKGROUND ART

In recent years, an organic EL display device including pixel circuits each including an organic EL element has been put to practical use. The organic EL element is also called an organic light-emitting diode (OLED) and is a self-emissive display element that emits light at luminance determined based on a current flowing therethrough. Since the organic EL element is thus a self-emissive display element, the organic EL display device can easily achieve slimming down, a reduction in power consumption, an increase in luminance, etc., compared to a liquid crystal display device that requires a backlight, a color filter, and the like. Thus, in recent years, development of organic EL display devices has been actively implemented. For a pixel circuit of an organic EL display device, typically, a thin-film transistor (TFT) is adopted as a drive transistor for controlling supply of a current to an organic EL element. However, the thin-film transistor is likely to cause variations in its characteristics. Specifically, variations are likely to occur in threshold voltage. If variations in threshold voltage occur in drive transistors provided in a display unit, then variations in luminance occur, degrading display quality. Hence, there are proposed various processes (compensation processes) for compensating for variations in threshold voltage.

For schemes for the compensation processes, there are known an internal compensation scheme in which a compensation process is performed by providing, in a pixel circuit, a capacitor for holding information on a threshold voltage of a drive transistor, and an external compensation scheme in which a compensation process is performed by, for example, measuring, by a circuit provided external to a pixel circuit, the magnitude of a current flowing through a drive transistor under a predetermined condition, and correcting a video signal based on a result of the measurement.

In addition, for a low power consumption display device, a display device that performs pause driving is known. The pause driving is a driving method in which a driving period and a pause period are provided when the same image is continuously displayed, and a drive circuit is operated during the driving period, whereas operation of the drive circuit is stopped during the pause period. The pause driving is also called “intermittent driving” or “low-frequency driving”. The pause driving can be applied when off-leakage current in the transistor in the pixel circuit is small.

When pause driving such as that described above is performed in an organic EL display device, during the driving period, an organic EL element in a pixel circuit is temporarily brought into turn-off state upon performing writing of a data voltage, but during the pause period, since operation of a drive circuit stops, the organic EL element continues to emit light at luminance determined based on a data voltage written during an immediately preceding driving period. During the pause driving, the driving period and the pause period alternately appear. For example, as shown in FIG. 26, generally, the pause period is significantly long compared to the driving period. For example, the driving period includes one or several frame periods, whereas the pause period includes several tens of frame periods. Note that in FIG. 26, a refresh frame period which is a frame period included in the driving period and which is a frame period during which writing of a data voltage is performed is given reference character RF, and a non-refresh frame period which is a frame period included in the pause period and which is a frame period during which writing of a data voltage is not performed is given reference character NRF. Thus, when pause driving is performed in the organic EL display device, turning off of the organic EL element during the driving period may be visually recognized as flicker.

Hence, there is proposed a configuration in which luminance is reduced at an appropriate frequency during the pause period by temporarily bringing the organic EL element into turn-off state also during the pause period in order to inhibit occurrence of flicker (hereinafter, this configuration is referred to as “periodic turn-off configuration”).

However, even if the periodic turn-off configuration is adopted, since a thin-film transistor serving as a drive transistor in a pixel circuit has hysteresis characteristics, when pause driving is performed, flicker is still visually recognized, which will be described in detail below. Note that here, voltage stress applied between the gate and source of the drive transistor is referred to as “Vgs stress”. Note also that it is assumed that the drive transistor is of P-channel type.

FIG. 27 is a diagram for describing virtual IV characteristics (current-voltage characteristics) taking into account the hole trap level in the drive transistor. In FIG. 27, a horizontal axis represents a gate-source voltage Vgs and a vertical axis represents a drain-source current Ids (the same also applies to FIGS. 28, 31, and 32). In an ideal state in which there is no influence of trap level, a constant IV characteristic is obtained regardless of the magnitude of Vgs stress. An IV characteristic in this case is always represented by, for example, a curve given reference character 91 in FIG. 27. In a state in which negative Vgs stress (Vgs stress that brings the drive transistor into on state) is provided to the drive transistor, an IV characteristic is represented by, for example, a curve given reference character 92 in FIG. 27. In a state in which positive Vgs stress (Vgs stress that brings the drive transistor into off state) is provided to the drive transistor, an IV characteristic is represented by, for example, a curve given reference character 93 in FIG. 27. When the Vgs stress is negative, the IV characteristic is an enhancement-type characteristic, and when the Vgs stress is positive, the IV characteristic is a depletion-type characteristic. As such, the IV characteristic of the drive transistor varies depending on the trap-level occupancy.

When the magnitude of the Vgs stress changes, the IV characteristic also changes. Note, however, that since hole trapping and hole detrapping take time to occur, the IV characteristic gently changes. For example, when a state in which negative Vgs stress is provided to the drive transistor is changed to a state in which positive Vgs stress is provided to the drive transistor, as indicated by an arrow given reference character 94 in FIG. 28, the IV characteristic gradually changes from a state in which the IV characteristic is represented by a curve given reference character 92 in FIG. 28 to a state in which the IV characteristic is represented by a curve given reference character 93 in FIG. 28. Since the IV characteristic thus gently changes, an IV characteristic immediately after the Vgs stress is changed is one based on Vgs stress provided before the change. As such, the drive transistor has hysteresis characteristics.

FIG. 29 is an energy band diagram for describing influence exerted by initialization of the drive transistor. Note that reference character Ef indicates the Fermi level. When the drive transistor is initialized, the gate-source voltage becomes negative. At this time, hole trapping proceeds near a channel (see a portion indicated by an arrow given reference character 901). By this, as shown in FIG. 30, the hole-trap occupancy in the channel increases during an initialization period. As a result, the IV characteristic of the drive transistor is an enhancement-type characteristic. During a writing period (a period during which a data signal is provided to a gate of the drive transistor), the hole-trap occupancy in the channel gradually decreases based on the data signal.

During a light-emission period, the gate-source voltage Vgs is high (the gate potential is high) compared to that during the initialization period. Thus, for example, as indicated by an arrow given reference character 97 in FIG. 31, the IV characteristic of the drive transistor gradually changes from a state in which the IV characteristic is represented by a curve given reference character 95 in FIG. 31 to a state in which the IV characteristic is represented by a curve given reference character 96 in FIG. 31. Since the IV characteristic gently changes, as can be grasped from a portion given reference character 911 in FIG. 30, the state of the channel changes during the light-emission period, too. That is, the IV characteristic changes during the light-emission period, too.

For example, it is assumed that an IV characteristic at the time of starting the light-emission period included in the driving period is represented by a curve given reference character 98 in FIG. 32, and an IV characteristic at the time of completing a change is represented by a curve given reference character 99 in FIG. 32. During the light-emission period, the gate-source voltage Vgs is maintained at a constant level. If the gate-source voltage Vgs is Va, then the drain-source current Ids at the time of starting the light-emission period is I1, whereas the drain-source current Ids at the time of completing a change in IV characteristic is I2. As such, during the light-emission period, the drain-source current Ids increases, by which luminance increases. In other words, actual luminance reaches target luminance after a certain period of time has elapsed since the start of the light-emission period. That is, the waveform of luminance is rounded.

As described above, during the driving period, the waveform of luminance is rounded. On the other hand, during the pause period, since the gate-source voltage is maintained at a constant level, there is no change in the IV characteristic of the drive transistor. Thus, during the pause period, the waveform of luminance is not rounded. Accordingly, the waveform of luminance differs between the driving period and the pause period. As a result, flicker is visually recognized.

In view of this, US 2020/0243017 A1 describes that a thin-film transistor having a bottom gate is adopted as a drive transistor, and the potential of the bottom gate is changed before the initialization period, by which positive Vgs stress is provided to the drive transistor. In addition, US 2020/0118487 A1 describes that negative or positive Vgs stress is provided to a drive transistor during the pause period so that a luminance waveform in the driving period is similar to a luminance waveform in the pause period.

PRIOR ART DOCUMENTS

Patent Documents

[Patent Document 1] US 2020/0,243,017 A
[Patent Document 2] US 2020/0,118,487 A

SUMMARY

Problems to be Solved by the Invention

However, according to a technique disclosed in US 2020/0243017 A1, a manufacturing process requires a step for forming a bottom gate of a drive transistor. For example, there is required a step of depositing and patterning a bottom-gate metal layer, and in some cases, there is required a step of making a contact hole that connects the bottom-gate metal layer to another metal layer.

In addition, regarding the technique disclosed in US 2020/0243017 A1, there is a concern that occurrence of flicker is not sufficiently suppressed, which will be described with reference to FIGS. 33 and 34. When positive Vgs stress is provided to a drive transistor by providing a high potential to a bottom gate, an energy band diagram for the drive transistor is such as that shown in FIG. 33. At this time, hole detrapping proceeds near an interface between a back-gate insulating film and a P—Si layer (see a portion indicated by an arrow given reference character 902 in FIG. 33). However, influence exerted by the provision of a high potential to the bottom gate is small near a channel (see a portion indicated by an arrow given reference character 903 in FIG. 33). Therefore, as can be grasped from a portion given reference character 912 in FIG. 34, the hole-trap occupancy in the channel does not decrease much during an off-Vgs application period (period during which positive Vgs stress is provided to the drive transistor). Thus, as shown in a portion given reference character 913 in FIG. 34, the state of the channel changes also during the light-emission period. As a result, the waveform of luminance is rounded during the driving period, resulting in different waveforms of luminance between the driving period and the pause period, and thus, flicker is visually recognized.

Furthermore, according to a technique disclosed in US 2020/0118487 A1, there is required driving operation in which a bias signal is provided to a control terminal of a drive transistor during the pause period, and thus, power consumption during the pause period increases due to the driving operation. That is, an effect of reducing power consumption by adopting pause driving is small.

An object of the following disclosure is therefore to suppress occurrence of flicker upon pause driving while suppressing an increase in power consumption in a display device that uses display elements driven by current.

Means for Solving the Problems

A pixel circuit according to some embodiments of the present disclosure is a pixel circuit provided in a display device that can operate in a pause driving mode in which a driving period and a pause period alternately appear, the driving period including one or a plurality of refresh frame periods during which writing of a data voltage is performed, and the pause period including one or a plurality of non-refresh frame periods during which writing of a data voltage is not performed, the pixel circuit including:

a display element configured to emit light at luminance determined based on an amount of a drive current supplied to the display element;

a drive transistor having a control terminal, a first conductive terminal, and a second conductive terminal and provided in series with the display element;

a drive current control node connected to the control terminal of the drive transistor;

a holding capacitor having one terminal connected to the drive current control node;

a write control transistor having a control terminal; a first conductive terminal to which a data voltage is provided; and a second conductive terminal connected to the first conductive terminal of the drive transistor;

a threshold voltage compensation transistor having a control terminal; a first conductive terminal connected to the second conductive terminal of the drive transistor; and a second conductive terminal connected to the drive current control node;

at least one light-emission control transistor having a control terminal, a first conductive terminal, and a second conductive terminal and provided in series with the display element and the drive transistor; and a reset circuit configured to provide an initialization voltage to the drive current control node after providing an off-voltage to the drive current control node, before the data voltage is provided to the drive current control node through the write control transistor, the drive transistor, and the threshold voltage compensation transistor, in a period, during which the at least one light-emission control transistor is maintained in off state, in a refresh frame period included in the driving period, the off-voltage bringing the drive transistor into off state, and the initialization voltage bringing the drive transistor into on state.

A display device according to some embodiments of the present disclosure is a display device including:

a display unit including a plurality of pixel circuits;

a display drive circuit configured to drive the plurality of pixel circuits; and a display control circuit configured to control the display drive circuit such that a driving period and a pause period alternately appear, the driving period including one or a plurality of refresh frame periods during which writing of data voltages to the plurality of pixel circuits is performed, and the pause period including one or a plurality of non-refresh frame periods during which writing of data voltages to the plurality of pixel circuits is not performed, wherein each of the plurality of pixel circuits includes:

a display element configured to emit light at luminance determined based on an amount of a drive current supplied to the display element;

a drive transistor having a control terminal, a first conductive terminal, and a second conductive terminal and provided in series with the display element;

a drive current control node connected to the control terminal of the drive transistor;

a holding capacitor having one terminal connected to the drive current control node;

a write control transistor having a control terminal; a first conductive terminal to which a data voltage is provided; and a second conductive terminal connected to the first conductive terminal of the drive transistor;

a threshold voltage compensation transistor having a control terminal; a first conductive terminal connected to the second conductive terminal of the drive transistor; and a second conductive terminal connected to the drive current control node;

at least one light-emission control transistor having a control terminal, a first conductive terminal, and a second conductive terminal and provided in series with the display element and the drive transistor; and a reset circuit configured to be able to provide an off-voltage and an initialization voltage to the drive current control node, the off-voltage bringing the drive transistor into off state, and the initialization voltage bringing the drive transistor into on state, and in a refresh frame period included in the driving period, the display control circuit controls the display drive circuit such that the initialization voltage is provided to the drive current control node by the reset circuit after the off-voltage is provided to the drive current control node by the reset circuit, before a data voltage is provided to the drive current control node through the write control transistor, the drive transistor, and the threshold voltage compensation transistor.

A driving method according to some embodiments of the present disclosure is a method of driving a display device including a plurality of pixel circuits, wherein each of the plurality of pixel circuits includes:

a display element configured to emit light at luminance determined based on an amount of a drive current supplied to the display element;

a drive transistor having a control terminal, a first conductive terminal, and a second conductive terminal and provided in series with the display element;

a drive current control node connected to the control terminal of the drive transistor;

a holding capacitor having one terminal connected to the drive current control node;

a write control transistor having a control terminal; a first conductive terminal to which a data voltage is provided; and a second conductive terminal connected to the first conductive terminal of the drive transistor;

a threshold voltage compensation transistor having a control terminal; a first conductive terminal connected to the second conductive terminal of the drive transistor; and a second conductive terminal connected to the drive current control node; and at least one light-emission control transistor having a control terminal, a first conductive terminal, and a second conductive terminal and provided in series with the display element and the drive transistor, the method includes a pause driving step of driving the plurality of pixel circuits such that a driving period and a pause period alternately appear, the driving period including one or a plurality of refresh frame periods during which writing of data voltages to the plurality of pixel circuits is performed, and the pause period including one or a plurality of non-refresh frame periods during which writing of data voltages to the plurality of pixel circuits is not performed, and the pause driving step includes:

a light-emission stopping step of changing the at least one light-emission control transistor from on state to off state in a refresh frame period included in the driving period;

an off-voltage applying step of providing an off-voltage to the drive current control node after the light-emission stopping step, the off-voltage bringing the drive transistor into off state;

an initializing step of providing an initialization voltage to the drive current control node after the off-voltage applying step, the initialization voltage bringing the drive transistor into on state;

a data voltage writing step of providing a data voltage to the drive current control node through the write control transistor, the drive transistor, and the threshold voltage compensation transistor after the initializing step; and a light-emission resuming step of changing the at least one light-emission control transistor from off state to on state after the data voltage writing step.

Effects of the Invention

According to some embodiments of the present disclosure, in a display device that can operate in a pause driving mode, in a refresh frame period, before a data voltage is provided to a drive current control node, an initialization voltage that brings a drive transistor into on state is provided to the drive current control node after an off-voltage that brings the drive transistor into off state is provided to the drive current control node by a reset circuit. By this, in the refresh frame period, before a data voltage is provided to the drive current control node, the hole-trap occupancy in a channel of the drive transistor sufficiently decreases and then increases. As a result, during a light-emission period in the refresh frame period, the hole-trap occupancy in the channel of the drive transistor is maintained at a substantially constant value. Therefore, there is almost no change in luminance in the light-emission period in the refresh frame period. That is, the waveform of luminance is not rounded. Thus, a luminance waveform in a driving period and a luminance waveform in a pause period are identical, suppressing occurrence of flicker. In addition, since a state in which the operation of the drive transistor stops is maintained during the pause period, there is no increase in power consumption. As such, it becomes possible to suppress occurrence of flicker upon pause driving while suppressing an increase in power consumption in a display device that uses display elements driven by current.

MODES FOR CARRYING OUT THE INVENTION

With reference to the accompanying drawings, embodiments will be described below. Note that in the following description, it is assumed that i and j are integers greater than or equal to 2, n is an integer between 1 and i, inclusive, and m is an integer between 1 and j, inclusive.

1. First Embodiment

<1.1 Overall Configuration>

Figure 2:
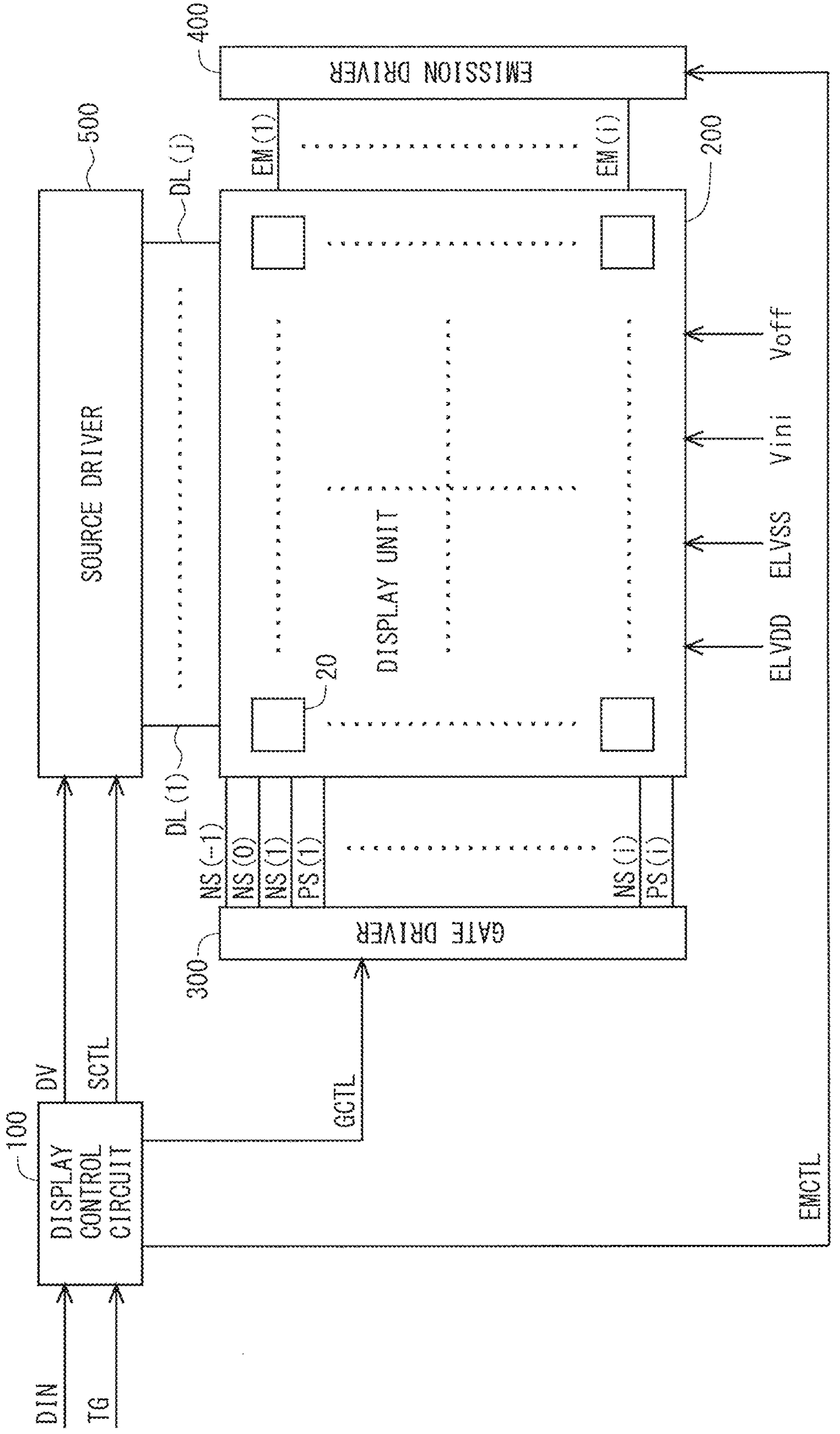
FIG. 2 is a block diagram showing an overall configuration of the organic EL display device in the first embodiment.

FIG. 2 is a block diagram showing an overall configuration of an organic EL display device according to a first embodiment. As shown in FIG. 2, the organic EL display device includes a display control circuit 100, a display unit 200, a gate driver (scanning signal line drive circuit) 300, an emission driver (light-emission control line drive circuit) 400, and a source driver (data signal line drive circuit) 500. A display drive circuit is implemented by the gate driver 300, the emission driver 400, and the source driver 500. Although the gate driver 300 is provided on only a one-edge side of the display unit 200 (in the drawing, to the left of the display unit 200) in FIG. 2, a configuration in which the gate driver 300 is provided on both the one-edge side of the display unit 200 and the other-edge side thereof (in the drawing, to the right of the display unit 200) can also be adopted. Likewise, a configuration in which the emission driver 400 is provided on both the one-edge side and other-edge side of the display unit 200 can also be adopted. Note that for a scheme for a compensation process, the internal compensation scheme is adopted.

In the display unit 200 there are disposed (i+2) first scanning signal lines NS(−1) to NS(i), i second scanning signal lines PS(1) to PS(i), i light-emission control lines EM(1) to EM(i), and j data signal lines DL(1) to DL(j). Note that depiction of those lines is omitted in the display unit 200 in FIG. 2. The first scanning signal lines NS(−1) to NS(i), the second scanning signal lines PS(1) to PS(i), and the light-emission control lines EM(1) to EM(i) are typically parallel to each other. The first scanning signal lines NS(−1) to NS(i) and the data signal lines DL(1) to DL(j) are orthogonal to each other. Each of the first scanning signal lines NS transmits a first scanning signal, each of the second scanning signal lines PS transmits a second scanning signal, each of the light-emission control lines EM transmits a light-emission control signal, and each of the data signal lines DL transmits a data signal. In the display unit 200 there are also provided i×j pixel circuits 20. The i×j pixel circuits 20 form a pixel matrix of i rows×j columns. In the following description, when necessary, the first scanning signal is also given reference character NS, the second scanning signal is also given reference character PS, the light-emission control signal is also given reference character EM, and the data signal is also given reference character DL.

Furthermore, in the display unit 200 there are disposed power lines (not shown) which are shared between the pixel circuits 20. More specifically, there are disposed a power line that supplies a high-level power supply voltage ELVDD for driving organic EL elements (hereinafter, referred to as "high-level power line"), a power line that supplies a low-level power supply voltage ELVSS for driving the organic EL elements (hereinafter, referred to as "low-level power line"), a power line that supplies an initialization voltage Vini for initializing the internal states of the pixel circuits 20 (hereinafter, referred to as "initialization power line"), and a power line that supplies a control voltage Voff for providing the aforementioned positive Vgs stress to drive transistors in the pixel circuits 20 (hereinafter, referred to as "control-voltage power line").

Meanwhile, the organic EL display device according to the present embodiment has two operating modes (a normal driving mode and a pause driving mode). In the normal driving mode, the organic EL display device operates such that a refresh frame period which is a frame period during which writing of a data voltage is performed continuously appears. In the pause driving mode, the organic EL display device operates such that a driving period including one or a plurality of refresh frame periods and a pause period including one or a plurality of non-refresh frame periods during which writing of a data voltage is not performed alternately appear.

Operation of each component shown in FIG. 2 will be described below. The display control circuit 100 receives an input image signal DIN and a timing signal group (a horizontal synchronizing signal, a vertical synchronizing signal, etc.) TG which are sent from an external source, and outputs digital video signals DV, gate control signals GCTL that control operation of the gate driver 300, emission driver control signals EMCTL that control operation of the emission driver 400, and source control signals SCTL that control operation of the source driver 500. The gate control signals GCTL include a gate start pulse signal, a gate clock signal, etc. The emission driver control signals EMCTL include an emission start pulse signal, an emission clock signal, etc. The source control signals SCTL include a source start pulse signal, a source clock signal, a latch strobe signal, etc.

The gate driver 300 is connected to the first scanning signal lines NS(−1) to NS(i) and the second scanning signal lines PS(1) to PS(i). The gate driver 300 applies first scanning signals to the first scanning signal lines NS(−1) to NS(i) and applies second scanning signals to the second scanning signal lines PS(1) to PS(i), based on the gate control signals GCTL outputted from the display control circuit 100. That is, the gate driver 300 sequentially and selectively drives the first scanning signal lines NS(−1) to NS(i) and the second scanning signal lines PS(1) to PS(i).

The emission driver 400 is connected to the light-emission control lines EM(1) to EM(i). The emission driver 400 applies light-emission control signals to the light-emission control lines EM(1) to EM(i), based on the emission driver control signals EMCTL outputted from the display control circuit 100.

The source driver 500 includes a j-bit shift register, a sampling circuit, a latch circuit, j D/A converters, and the like, which are not shown. The shift register has j cascade-connected registers. The shift register transfers, in turn, a pulse of the source start pulse signal supplied to a register at an initial stage, from an input terminal to an output terminal based on the source clock signal. In response to the transfer of the pulse, a sampling pulse is outputted from each stage of the shift register. Based on the sampling pulse, the sampling circuit stores digital video signals DV. The latch circuit captures and holds digital video signals DV for one row that are stored in the sampling circuit, in accordance with the latch strobe signal. The D/A converters are provided so as to correspond to the respective data signal lines DL(1) to DL(j). The D/A converters convert the digital video signals DV held in the latch circuit into analog voltages. The converted analog voltages are simultaneously applied, as data signals, to all data signal lines DL(1) to DL(j).

In the above-described manner, the data signals are applied to the data signal lines DL(1) to DL(j), the first scanning signals are applied to the first scanning signal lines NS(−1) to NS(i), the second scanning signals are applied to the second scanning signal lines PS(1) to PS(i), and the light-emission control signals are applied to the light-emission control lines EM(1) to EM(i), by which an image based on the input image signal DIN is displayed on the display unit 200.

<1.2 Configuration of the Pixel Circuits>

Figure 3:
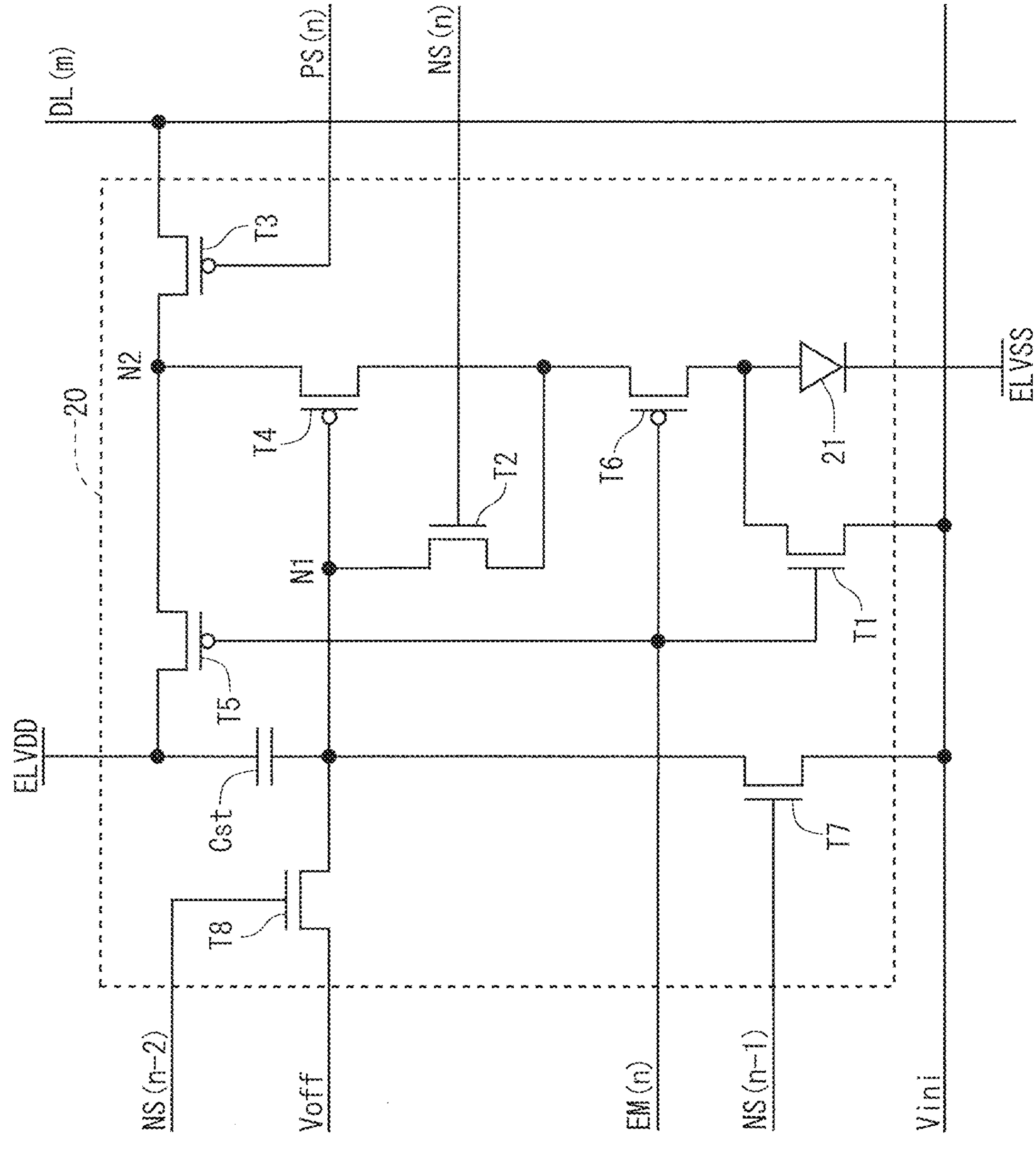
FIG. 3 is a circuit diagram showing a configuration of the pixel circuit in the first embodiment.

With reference to FIG. 3, a configuration of a pixel circuit 20 in the present embodiment will be described. Note that the pixel circuit 20 shown in FIG. 3 is a pixel circuit 20 in an nth row and an mth column. As shown in FIG. 3, the pixel circuit 20 includes one organic EL element (organic light-emitting diode) 21 serving as a display element; eight transistors T1 to T8 (a first initialization transistor T1, a threshold voltage compensation transistor T2, a write control transistor T3, a drive transistor T4, a first light-emission control transistor T5, a second light-emission control transistor T6, a second initialization transistor T7, and an off-voltage application transistor T8); and one holding capacitor Cst. The holding capacitor Cst is a capacitive element including two electrodes (a first electrode and a second electrode).

Meanwhile, the transistors T1, T2, T7, and T8 are N-channel IGZO-TFTs (thin-film transistors having a channel layer made of an oxide semiconductor containing indium, gallium, zinc, and oxygen). The transistors T3 to T6 are P-channel LTPS-TFTs (thin-film transistors having a channel layer made of low-temperature polysilicon). For these transistors, the IGZO-TFT has a small off-leakage current and thus is desirable as a switching element in a pixel circuit, etc. In addition, the low-temperature polysilicon has high mobility, and thus, when an LTPS-TFT is used as a drive transistor, the ability to drive an organic EL element improves, and when an LTPS-TFT is used as a switching element, the on-resistance decreases. Note that in the pixel circuit 20, the transistors T1 to T3 and T5 to T8 other than the drive transistor T4 operate as switching elements.

The first initialization transistor T1 is connected at its control terminal to a light-emission control line EM(n) in the nth row, connected at its first conductive terminal to a second conductive terminal of the second light-emission control transistor T6 and an anode of the organic EL element 21, and connected at its second conductive terminal to an initialization power line. The threshold voltage compensation transistor T2 is connected at its control terminal to a first scanning signal line NS(n) in the nth row, connected at its first conductive terminal to a second conductive terminal of the drive transistor T4 and a first conductive terminal of the second light-emission control transistor T6, and connected at its second conductive terminal to a control terminal of the drive transistor T4, a first conductive terminal of the second initialization transistor T7, a second conductive terminal of the off-voltage application transistor T8, and the second electrode of the holding capacitor Cst.

The write control transistor T3 is connected at its control terminal to a second scanning signal line PS(n) in the nth row, connected at its first conductive terminal to a data signal line DL(m) in the mth column, and connected at its second conductive terminal to a first conductive terminal of the drive transistor T4 and a second conductive terminal of the first light-emission control transistor T5. The drive transistor T4 is connected at its control terminal to the second conductive terminal of the threshold voltage compensation transistor T2, the first conductive terminal of the second initialization transistor T7, the second conductive terminal of the off-voltage application transistor T8, and the second electrode of the holding capacitor Cst, connected at its first conductive terminal to the second conductive terminal of the write control transistor T3 and the second conductive terminal of the first light-emission control transistor T5, and connected at its second conductive terminal to the first conductive terminal of the threshold voltage compensation transistor T2 and the first conductive terminal of the second light-emission control transistor T6.

The first light-emission control transistor T5 is connected at its control terminal to the light-emission control line EM(n) in the nth row, connected at its first conductive terminal to a high-level power line, and connected at its second conductive terminal to the second conductive terminal of the write control transistor T3 and the first conductive terminal of the drive transistor T4. The second light-emission control transistor T6 is connected at its control terminal to the light-emission control line EM(n) in the nth row, connected at its first conductive terminal to the first conductive terminal of the threshold voltage compensation transistor T2 and the second conductive terminal of the drive transistor T4, and connected at its second conductive terminal to the first conductive terminal of the first initialization transistor T1 and the anode of the organic EL element 21.

The second initialization transistor T7 is connected at its control terminal to a first scanning signal line NS(n−1) in an (n−1)th row, connected at its first conductive terminal to the second conductive terminal of the threshold voltage compensation transistor T2, the control terminal of the drive transistor T4, the second conductive terminal of the off-voltage application transistor T8, and the second electrode of the holding capacitor Cst, and connected at its second conductive terminal to the initialization power line. The off-voltage application transistor T8 is connected at its control terminal to a first scanning signal line NS(n−2) in an (n−2)th row, connected at its first conductive terminal to a control-voltage power line, and connected at its second conductive terminal to the second conductive terminal of the threshold voltage compensation transistor T2, the control terminal of the drive transistor T4, the first conductive terminal of the second initialization transistor T7, and the second electrode of the holding capacitor Cst.

The holding capacitor Cst is connected at its first electrode to the high-level power line and connected at its second electrode to the second conductive terminal of the threshold voltage compensation transistor T2, the control terminal of the drive transistor T4, the first conductive terminal of the second initialization transistor T7, and the second conductive terminal of the off-voltage application transistor T8. The organic EL element 21 is connected at its anode to the first conductive terminal of the first initialization transistor T1 and the second conductive terminal of the second light-emission control transistor T6, and connected at its cathode to a low-level power line.

As can be grasped from FIG. 3, the second conductive terminal of the threshold voltage compensation transistor T2, the control terminal of the drive transistor T4, the first conductive terminal of the second initialization transistor T7, the second conductive terminal of the off-voltage application transistor T8, and the second electrode of the holding capacitor Cst are connected to each other. A region (wiring line) where they are connected to each other is referred to as "first node". The first node is given reference character N1. In addition, the second conductive terminal of the write control transistor T3, the first conductive terminal of the drive transistor T4, and the second conductive terminal of the first light-emission control transistor T5 are connected to each other. A region (wiring line) where they are connected to each other is referred to as "second node". The second node is given reference character N2.

Note that a drive current control node is implemented by the first node N1, and a drive current control node initialization transistor is implemented by the second initialization transistor T7.

1.3 Comparative Example

Figure 4:
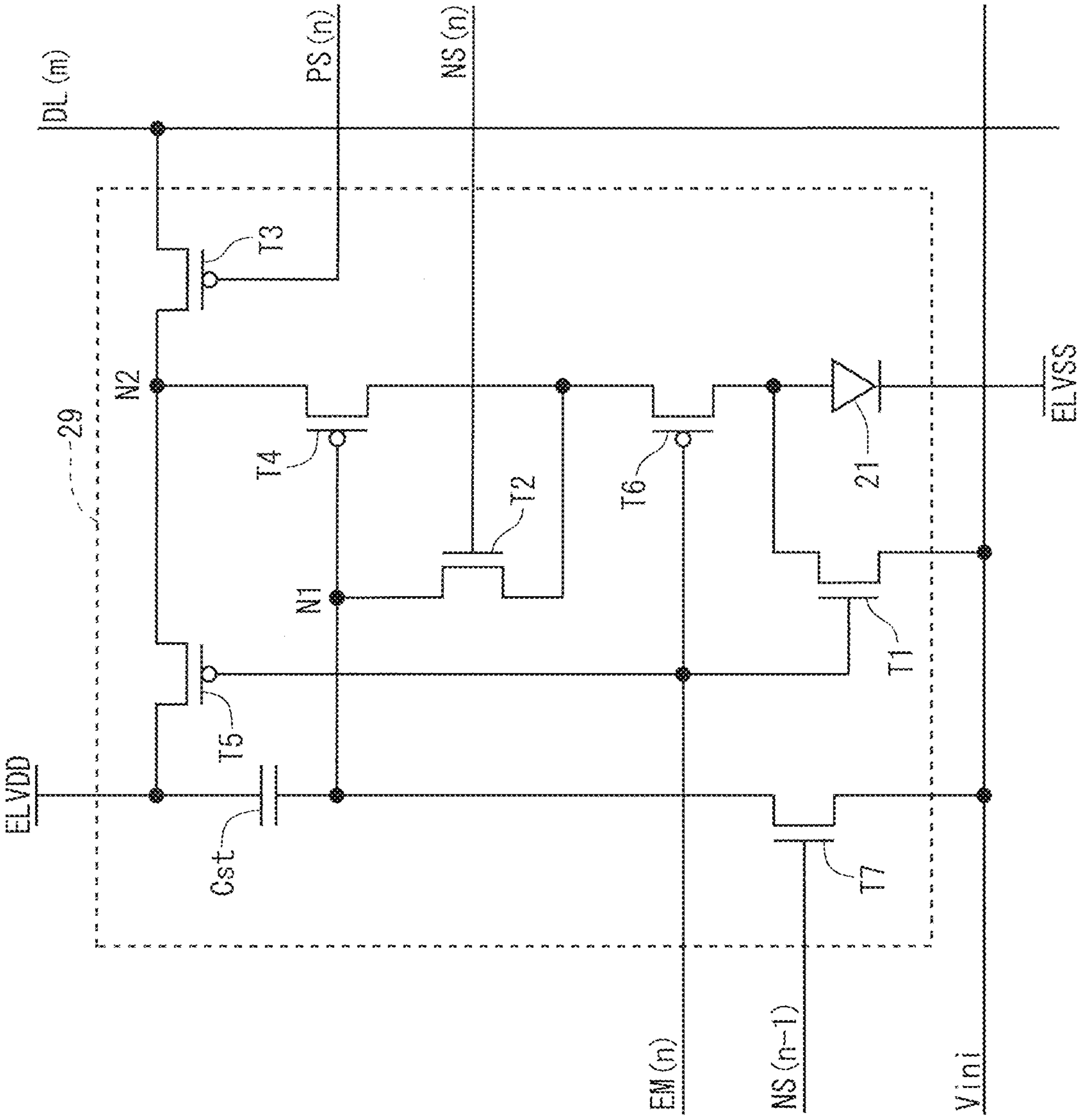
FIG. 4 is a circuit diagram showing a configuration of a pixel circuit in a comparative example.

Here, a comparative example for comparing with the present embodiment will be described. FIG. 4 is a circuit diagram showing a configuration of a pixel circuit 29 in the comparative example. Unlike the pixel circuit 20 shown in FIG. 3, this pixel circuit 29 is not provided with the off-voltage application transistor T8. Other than that, the pixel circuit 29 and the pixel circuit 20 have the same configuration.

Figure 5:
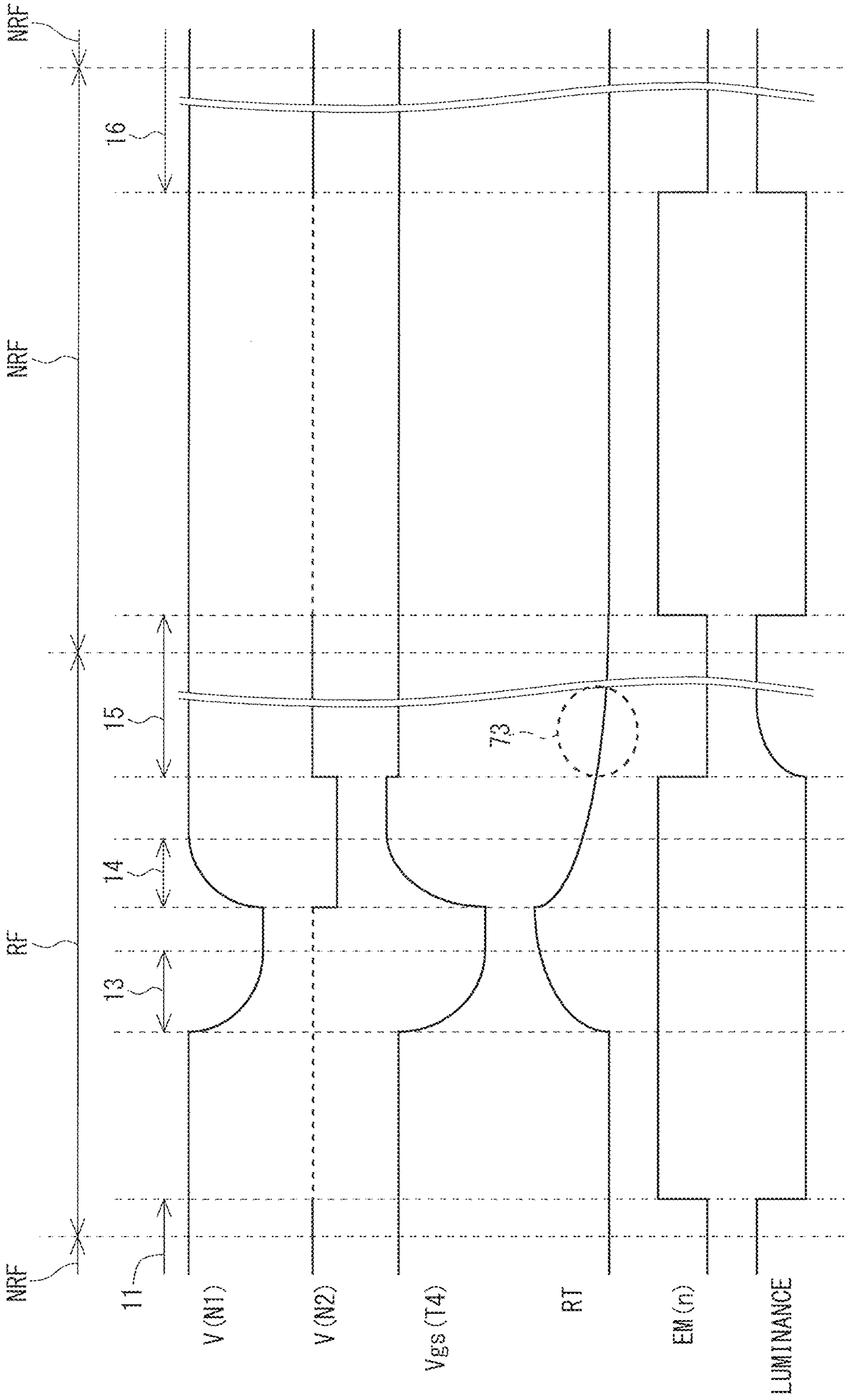
FIG. 5 is a waveform diagram for describing operation of the pixel circuit when an organic EL display device operates in the pause driving mode in the comparative example.

FIG. 5 is a waveform diagram for describing operation of the pixel circuit 29 when an organic EL display device operates in the pause driving mode in the comparative example. In FIG. 5, V(N1) indicates the potential at the first node N1 (i.e., the gate potential of the drive transistor T4), V(N2) indicates the potential at the second node N2 (i.e., the source potential of the drive transistor T4), Vgs(T4) indicates the voltage between the control terminal and first conductive terminal of the drive transistor T4 (i.e., the gate-source voltage of the drive transistor T4), and RT indicates the hole-trap occupancy in a channel of the drive transistor T4 (the same also applies to FIG. 1). Note that in FIG. 5, waveforms of a first scanning signal NS and a second scanning signal PS are omitted. Note also that in FIGS. 6 to 9, the states of the transistors T1 to T3 and T5 to T7 which are used as switching elements are represented by ON or OFF.

Figure 6:
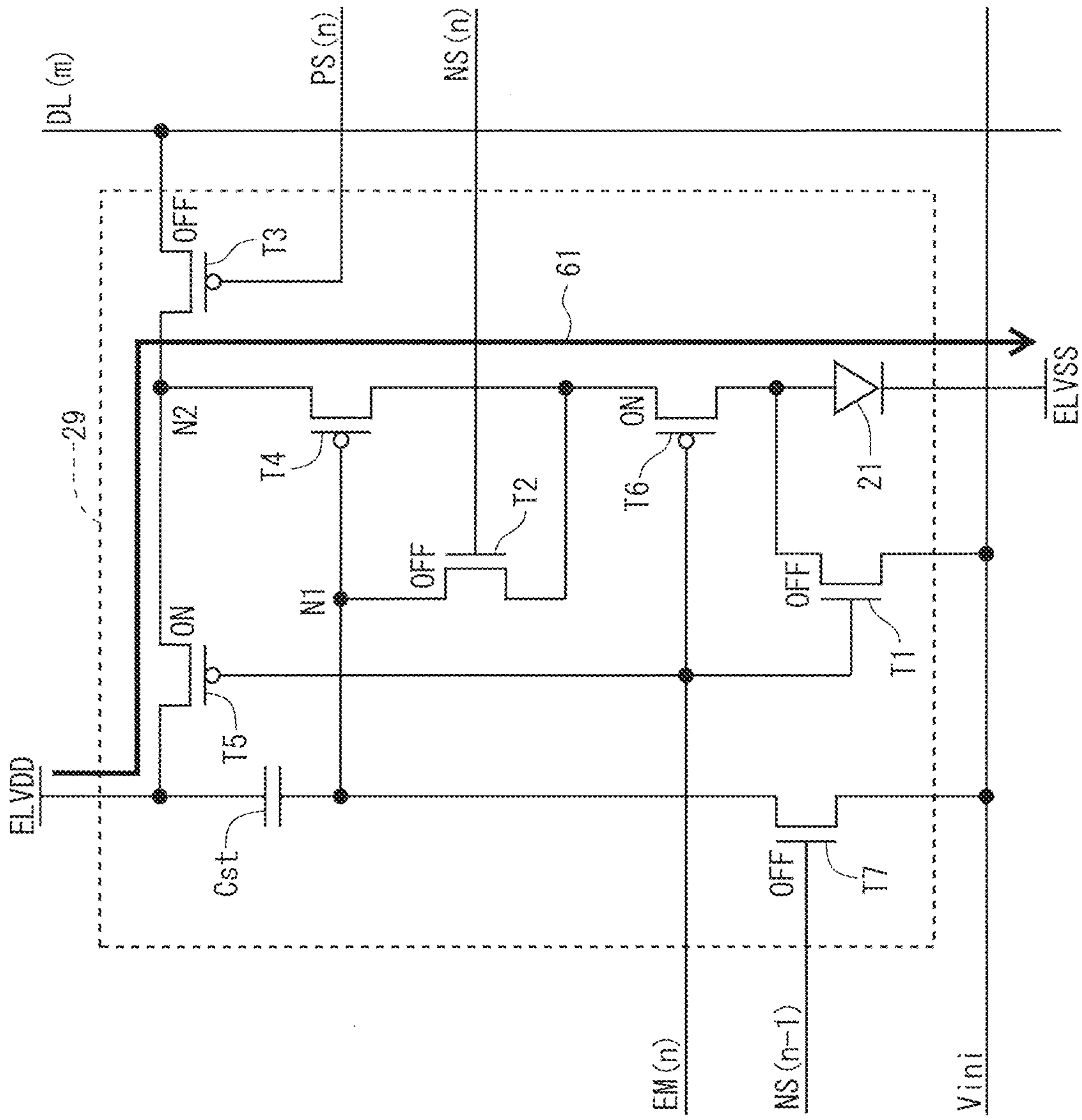
FIG. 6 is a diagram for describing operation of the pixel circuit during a light-emission period in the comparative example.
Figure 7:
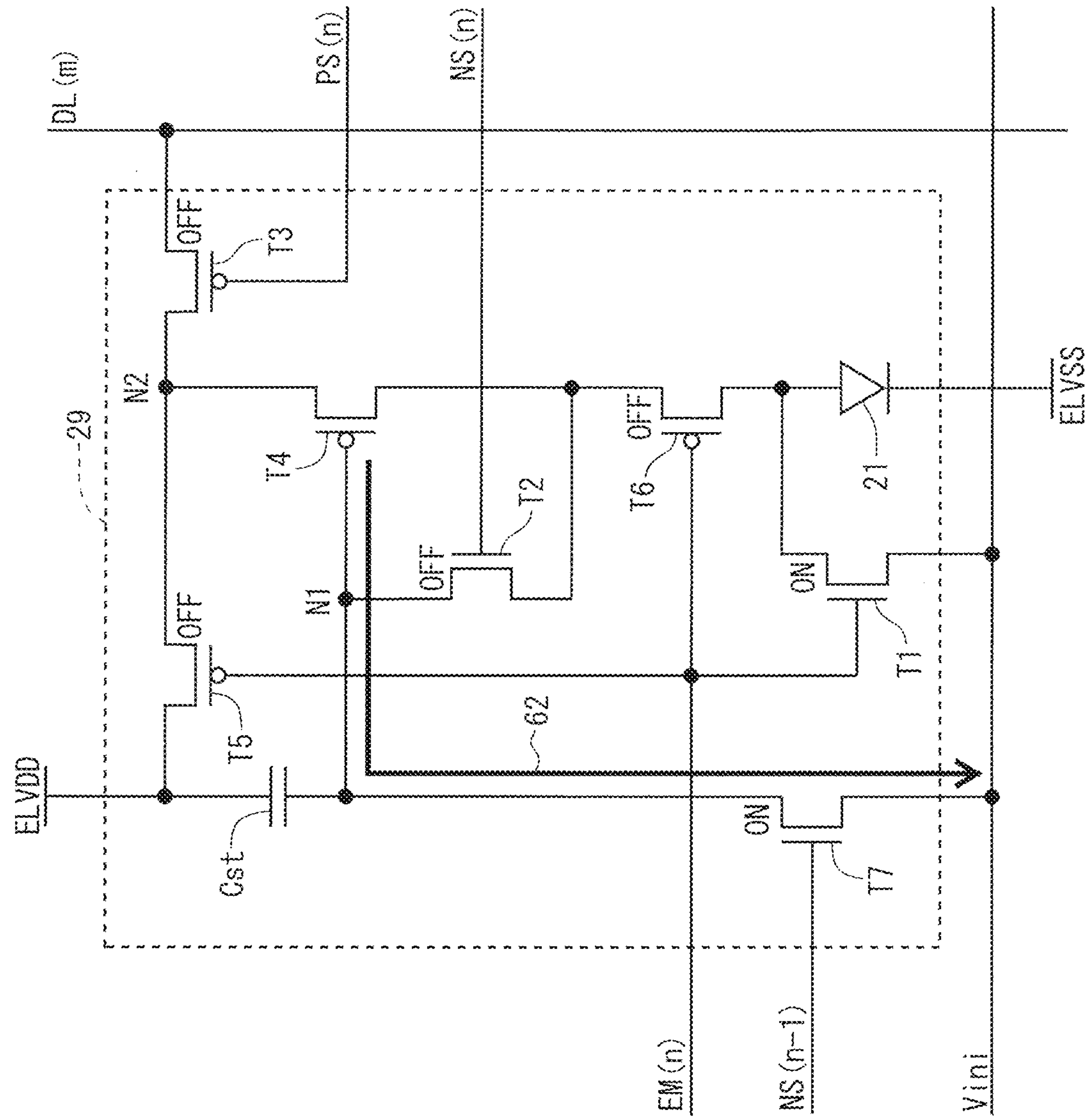
FIG. 7 is a diagram for describing operation of the pixel circuit during an initialization period in the comparative example.
Figure 8:
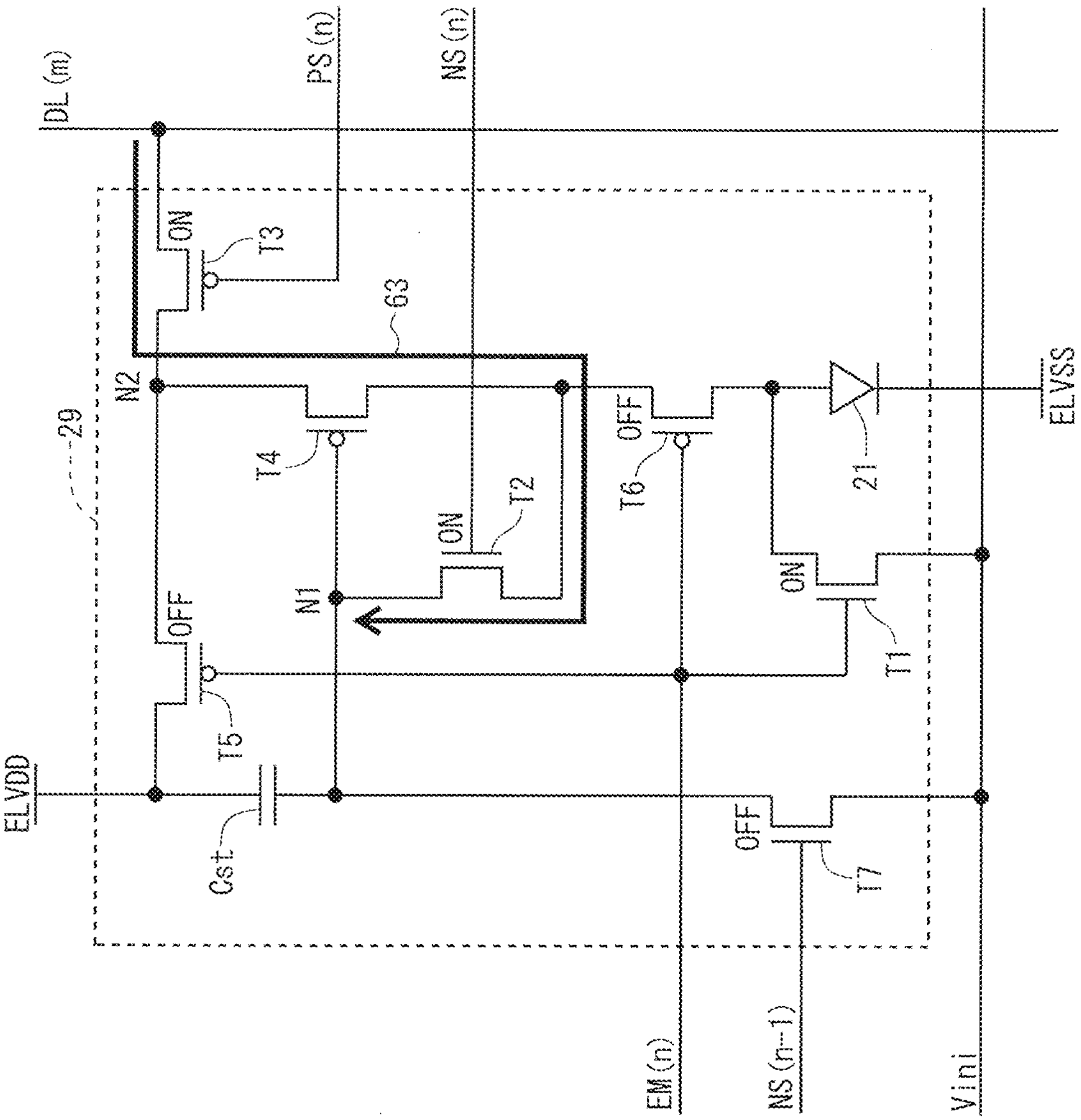
FIG. 8 is a diagram for describing operation of the pixel circuit during a writing period in the comparative example.

During a light-emission period 11, which is a period before the light-emission control signal EM(n) changes from low level to high level in a refresh frame period RF, the first light-emission control transistor T5 and the second light-emission control transistor T6 are maintained in on state, by which a drive current flows as indicated by an arrow given reference character 61 in FIG. 6. By this, the organic EL element 21 emits light based on the magnitude of the drive current.

When the light-emission control signal EM(n) changes from low level to high level, the first light-emission control transistor T5 and the second light-emission control transistor T6 go into off state. In an initialization period 13, a first scanning signal NS(n−1) changes from low level to high level, by which the second initialization transistor T7 goes into on state. By this, as indicated by an arrow given reference character 62 in FIG. 7, the potential at the first node N1 is initialized based on an initialization voltage Vini. Specifically, the potential V(N1) at the first node N1 sufficiently decreases, and accordingly, the gate-source voltage Vgs(T4) of the drive transistor T4 sufficiently decreases.

Thereafter, in a writing period 14, a first scanning signal NS(n) changes from low level to high level, by which the threshold voltage compensation transistor T2 goes into on state, and a second scanning signal PS(n) changes from high level to low level, by which the write control transistor T3 goes into on state. By this, as indicated by an arrow given reference character 63 in FIG. 8, a data signal (data voltage) DL(m) is provided to the first node N1 through the write control transistor T3, the drive transistor T4, and the threshold voltage compensation transistor T2. That is, a data voltage is provided, through the diode-connected drive transistor T4, to the control terminal of the drive transistor T4. At this time, when the gate-source voltage of the drive transistor T4 becomes equal to a threshold voltage of the drive transistor T4, the drive transistor T4 goes into off state. Thus, the potential V(N1) at the first node N1 becomes equal to the sum of the source potential V(N2) of the drive transistor T4 and the threshold voltage of the drive transistor T4. As a result, when a drive current is supplied to the organic EL element 21 during a light-emission period 15, variations in the threshold voltage of the drive transistor T4 are compensated for.

In the light-emission period 15, the light-emission control signal EM(n) changes from high level to low level, by which the first light-emission control transistor T5 and the second light-emission control transistor T6 go into on state. By this, a drive current flows as indicated by the arrow given reference character 61 in FIG. 6, by which the organic EL element 21 emits light based on the magnitude of the drive current.

Figure 9:
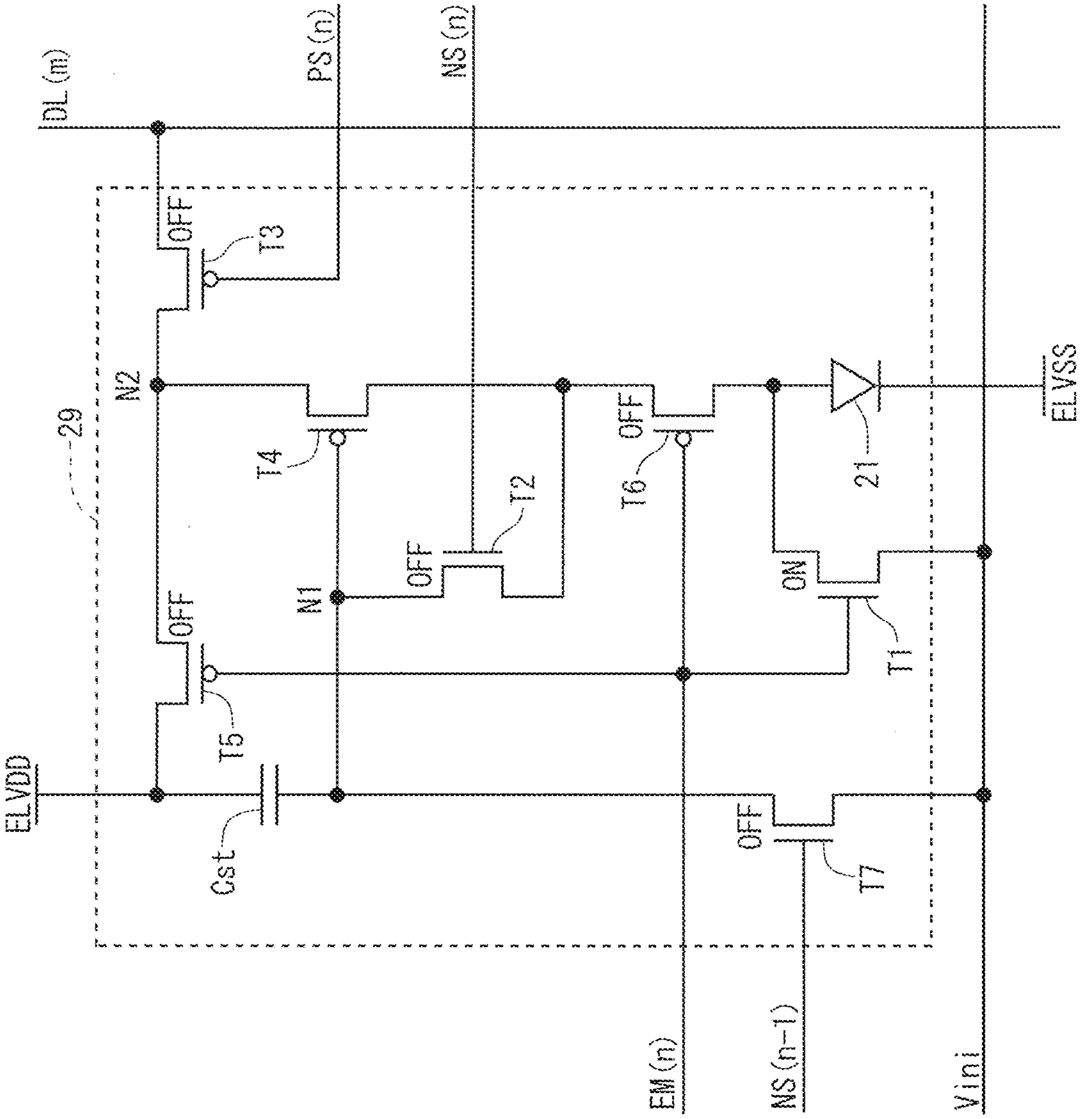
FIG. 9 is a diagram for describing operation of the pixel circuit during a turn-off period in the comparative example.

Thereafter, when the light-emission control signal EM(n) changes from low level to high level in a non-refresh frame period NRF, the first light-emission control transistor T5 and the second light-emission control transistor T6 go into off state, and the light-emission period 15 is terminated. Since the first light-emission control transistor T5 and the second light-emission control transistor T6 are maintained in off state throughout a period (turn-off period) before a next light-emission period 16 starts, a drive current is not supplied to the organic EL element 21, and thus, the organic EL element 21 is maintained in turn-off state (see FIG. 9). In addition, driving of the first scanning signal line NS and the second scanning signal line PS also stops, and thus, as shown in FIG. 9, the threshold voltage compensation transistor T2, the write control transistor T3, and the second initialization transistor T7 are maintained in off state.

In the light-emission period 16, the light-emission control signal EM(n) changes from high level to low level, by which the first light-emission control transistor T5 and the second light-emission control transistor T6 go into on state. By this, a drive current flows as indicated by the arrow given reference character 61 in FIG. 6, by which the organic EL element 21 emits light based on the magnitude of the drive current.

According to the comparative example such as that described above, as shown in FIG. 5, the hole-trap occupancy RT in the channel of the drive transistor T4 increases during the initialization period 13, and gradually decreases after starting the writing period 14. However, the hole-trap occupancy RT is not sufficiently reduced at the time of starting the light-emission period 15. Therefore, as shown in a portion given reference character 73 in FIG. 5, the hole-trap occupancy RT decreases in the light-emission period 15, too. That is, the state of the channel is changing in the light-emission period 15. As a result, the waveform of luminance is rounded in a driving period, resulting in different waveforms of luminance between the driving period and a pause period, and thus, flicker is visually recognized.

<1.4 Driving Method>

Figure 1:
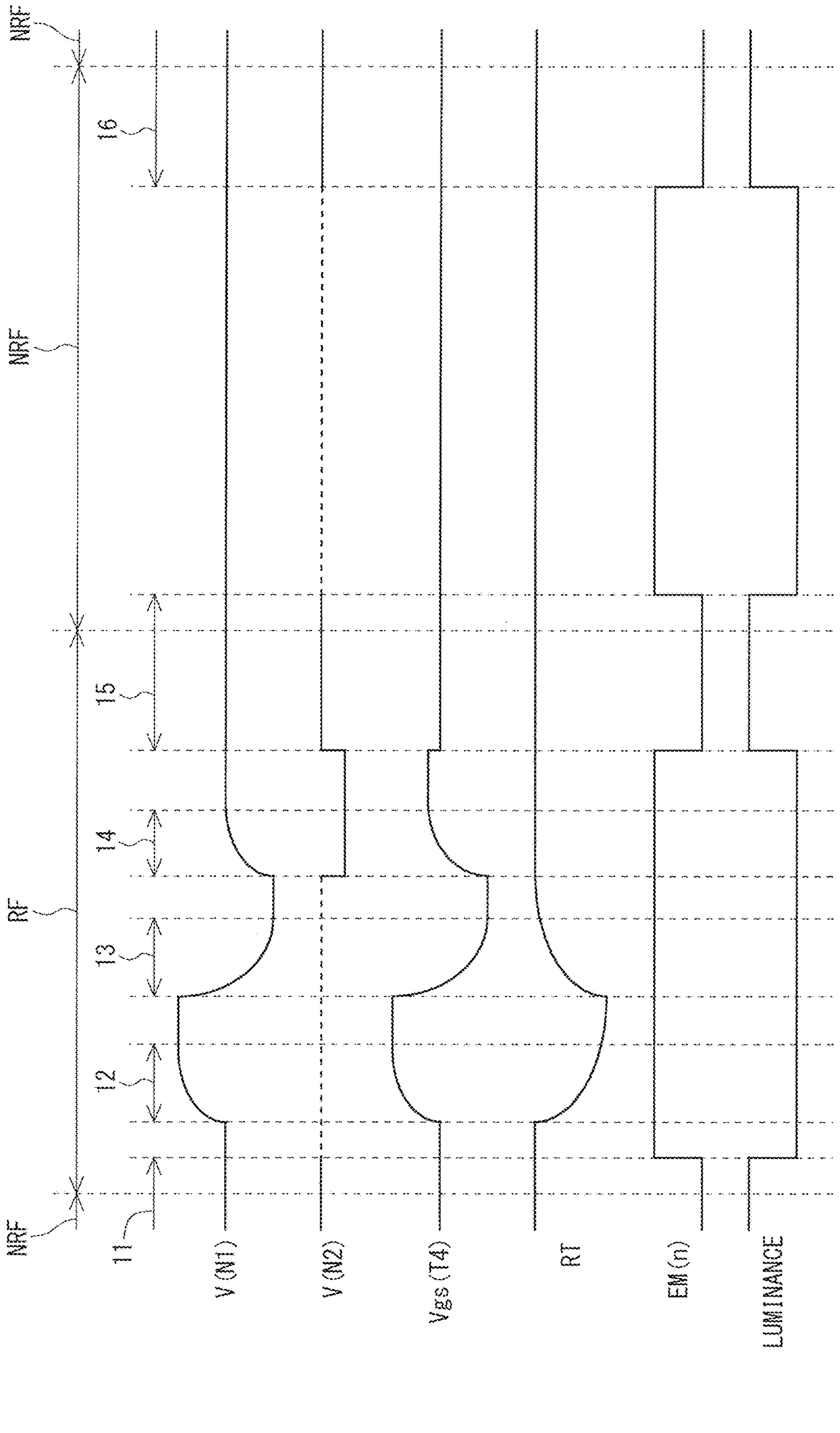
FIG. 1 is a timing chart for describing operation of a pixel circuit when an organic EL display device operates in a pause driving mode in a first embodiment.
Figure 10:
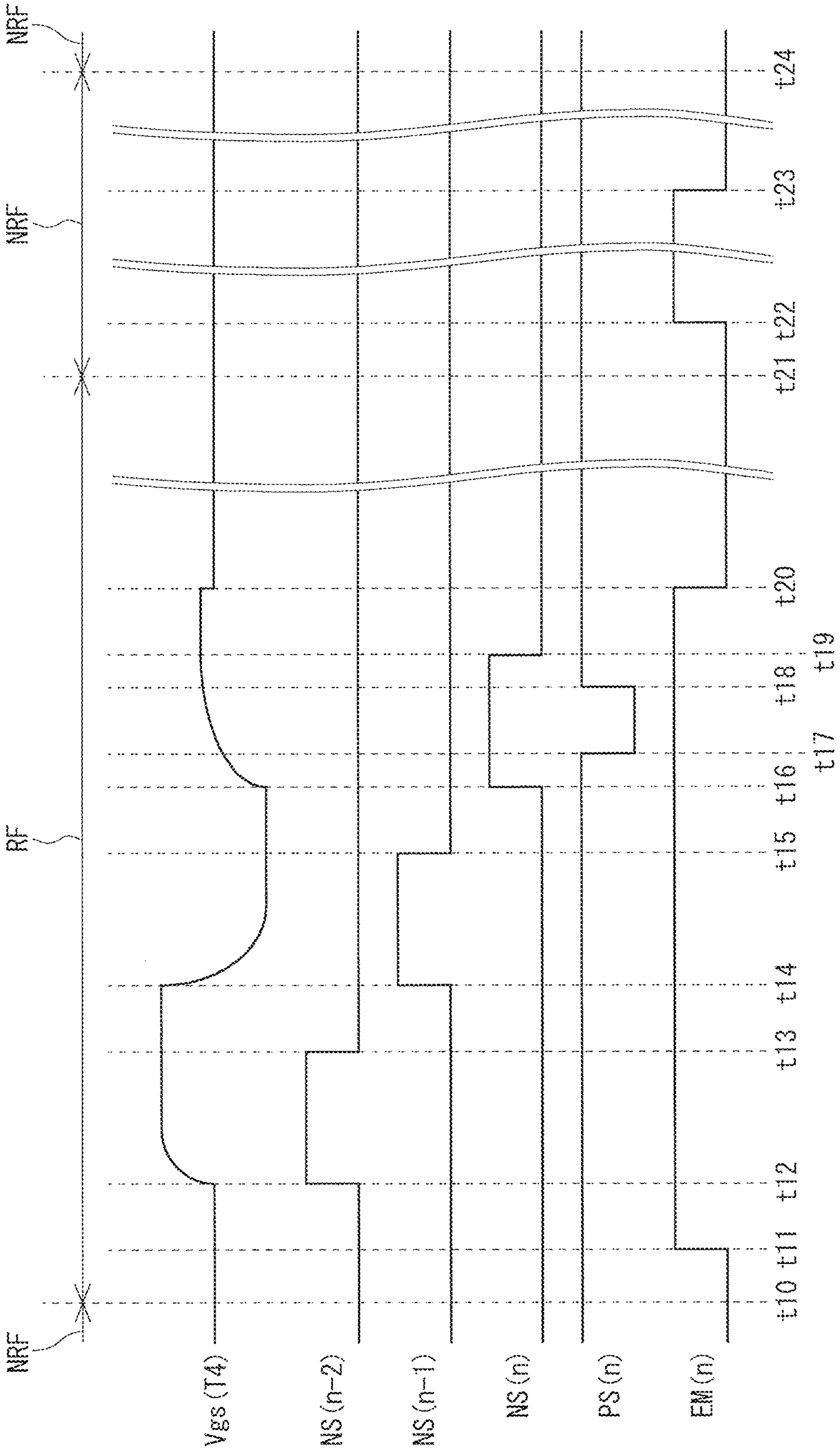
FIG. 10 is a waveform diagram for describing operation of the pixel circuit when the organic EL display device operates in the pause driving mode in the first embodiment.

Next, with reference to FIGS. 1 and 10, operation of the pixel circuit 20 when the organic EL display device operates in the pause driving mode in the present embodiment will be described. In FIG. 10, a period from time point t10 to time point t21 is a refresh frame period RF, and a period from time point t21 to time point t24 is a non-refresh frame period NRF.

Figure 11:
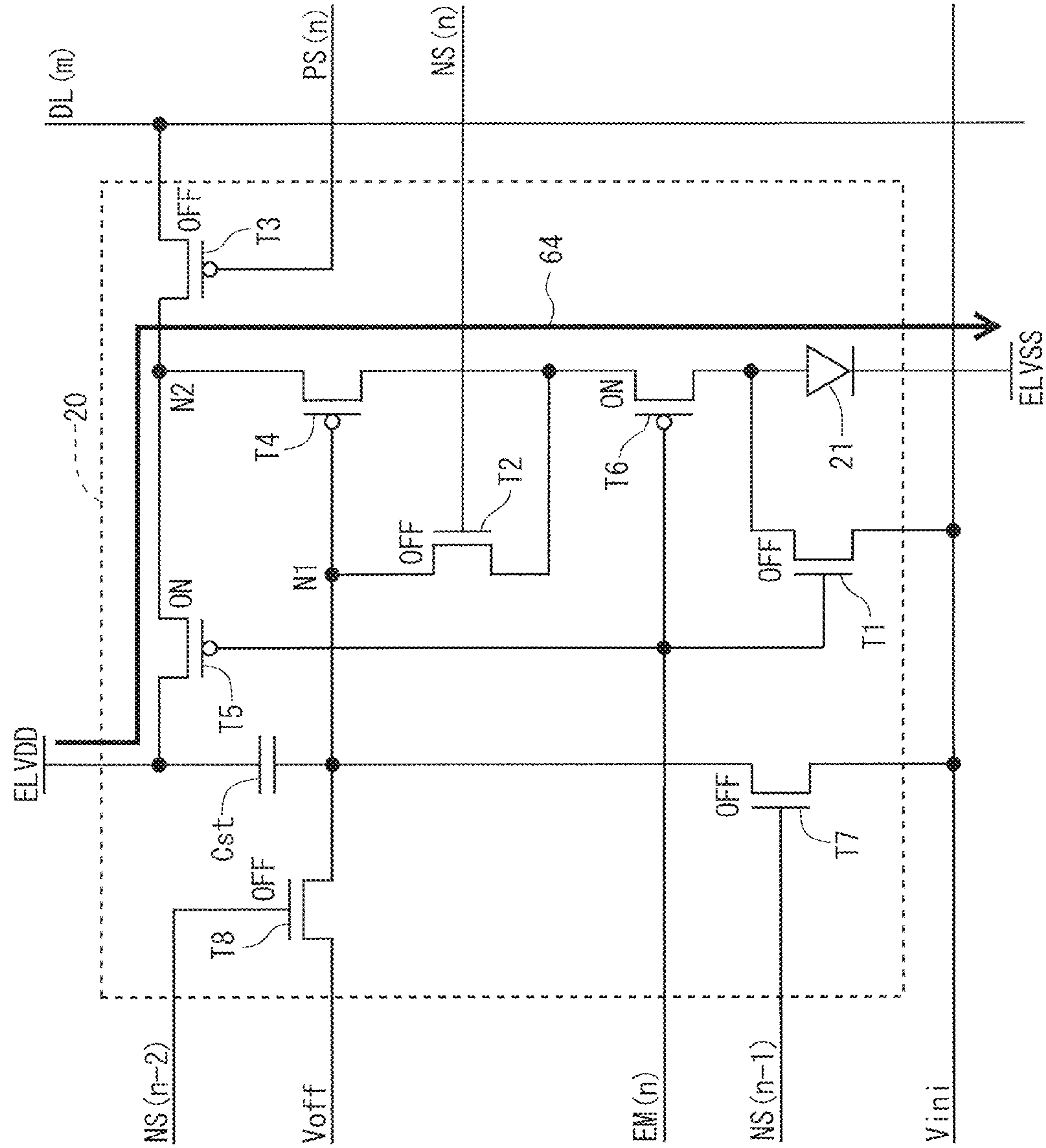
FIG. 11 is a diagram for describing operation of the pixel circuit during a light-emission period in the first embodiment.

During a period from time point t10 which is the time of starting the refresh frame period RF to time point t11, the light-emission control signal EM(n) is maintained at low level, and thus, the first light-emission control transistor T5 and the second light-emission control transistor T6 are in on state. At this time, the gate-source voltage Vgs(T4) of the drive transistor T4 is at a level based on writing of a data voltage performed in the last refresh frame period RF. Thus, as indicated by an arrow given reference character 64 in FIG. 11, a drive current based on writing of a data voltage performed in the last refresh frame period RF flows. By this, the organic EL element 21 emits light based on the magnitude of the drive current. Note that a period before time point t11 in FIG. 10 corresponds to the light-emission period 11 in FIG. 1.

At time point t11, the light-emission control signal EM(n) changes from low level to high level. By this, the first light-emission control transistor T5 and the second light-emission control transistor T6 go into off state. As a result, supply of the current to the organic EL element 21 is interrupted, by which the organic EL element 21 goes into turn-off state. In addition, by the light-emission control signal EM(n) changing from low level to high level, the first initialization transistor T1 goes into on state. By this, the anode potential is initialized based on the initialization voltage Vini.

Figure 12:
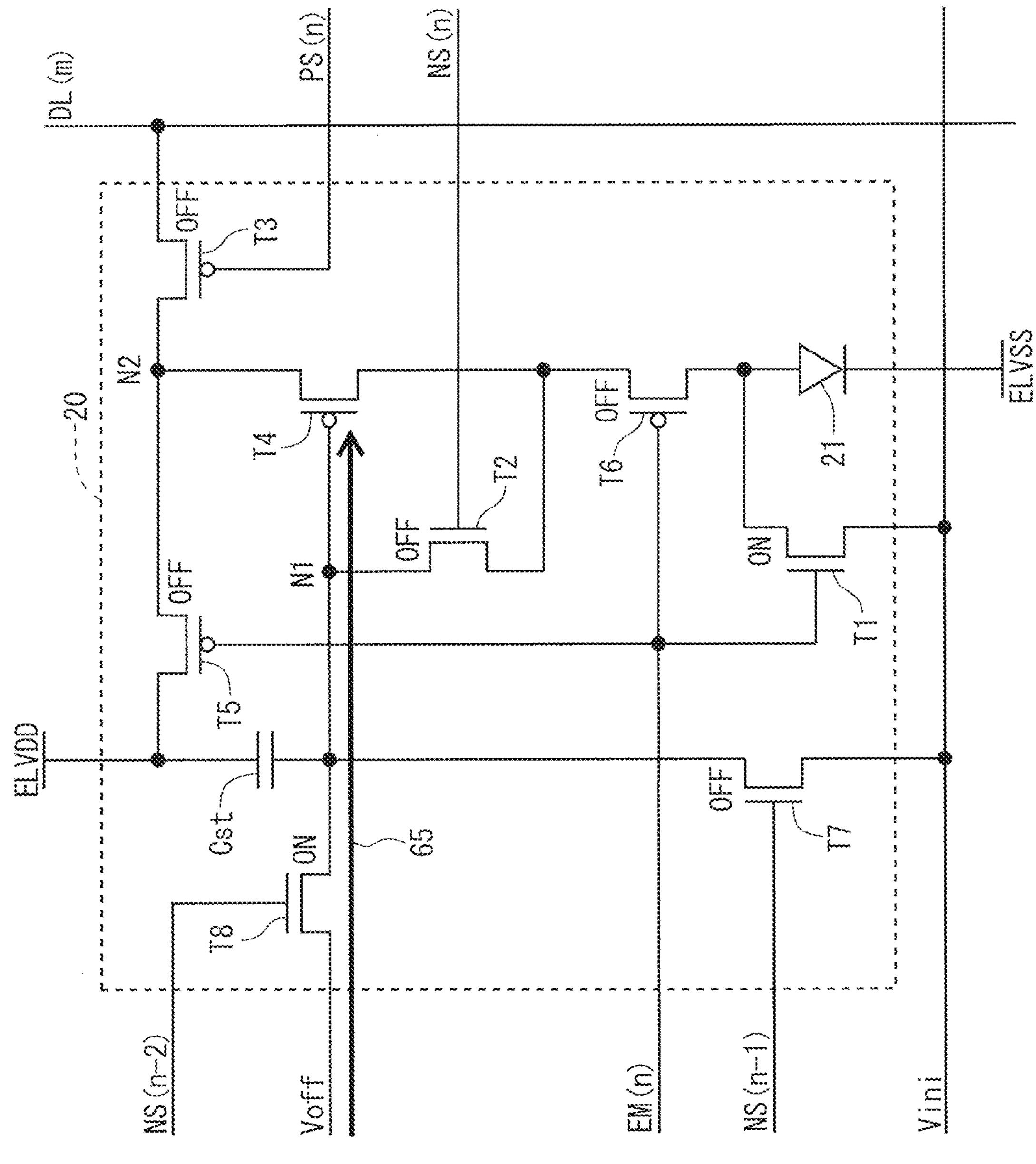
FIG. 12 is a diagram for describing operation of the pixel circuit during an off-voltage application period in the first embodiment.

At time point t12, the first scanning signal NS(n−2) changes from low level to high level. By this, the off-voltage application transistor T8 goes into on state, and a control voltage Voff is provided to the first node N1 as indicated by an arrow given reference character 65 in FIG. 12. In other words, the control voltage Voff is provided to the control terminal of the drive transistor T4. The control voltage Voff is a high-level voltage that brings the drive transistor T4 into off state. Thus, by an increase in the potential V(N1) at the first node N1, the gate-source voltage Vgs(T4) of the drive transistor T4 increases. Thereafter, at time point t13, the first scanning signal NS(n−2) changes from high level to low level, by which the off-voltage application transistor T8 goes into off state. As such, a period from time point t12 to time point t13 is a period during which a voltage (off-voltage) that brings the drive transistor T4 into off state is provided to the control terminal of the drive transistor T4 (hereinafter, this period is referred to as “off-voltage application period”). A period indicated by an arrow given reference character 12 in FIG. 1 is the off-voltage application period. Note that a specific voltage value of the control voltage Voff and the length of the off-voltage application period are adjusted in advance by experiments or simulations performed using a target device. In the experiments, by changing the voltage value of the control voltage Voff and the length of the off-voltage application period, a combination (a combination of the voltage value and the length of the off-voltage application period) by which flicker level is sufficiently small is identified by observation.

Figure 13:
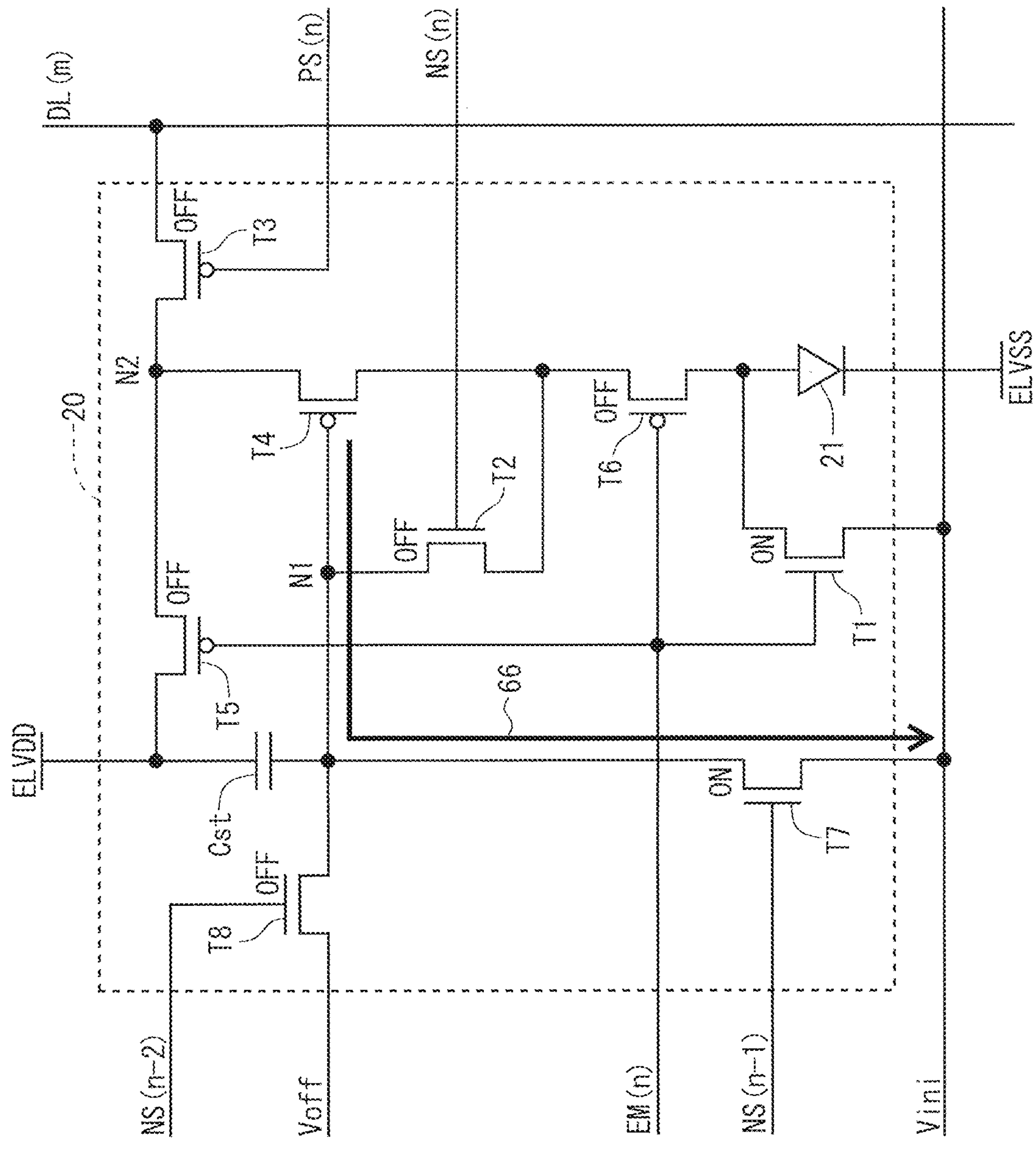
FIG. 13 is a diagram for describing operation of the pixel circuit during an initialization period in the first embodiment.

At time point t14, the first scanning signal NS(n−1) changes from low level to high level, by which the second initialization transistor T7 goes into on state. By this, as indicated by an arrow given reference character 66 in FIG. 13, the potential V(N1) at the first node N1 is initialized based on the initialization voltage Vini. Specifically, the potential V(N1) at the first node N1 sufficiently decreases, and accordingly, the gate-source voltage Vgs(T4) of the drive transistor T4 sufficiently decreases. At time point t15, the first scanning signal NS(n−1) changes from high level to low level. By this, the second initialization transistor T7 goes into off state. Note that a period from time point t14 to time point t15 in FIG. 10 corresponds to the initialization period 13 in FIG. 1.

Figure 14:
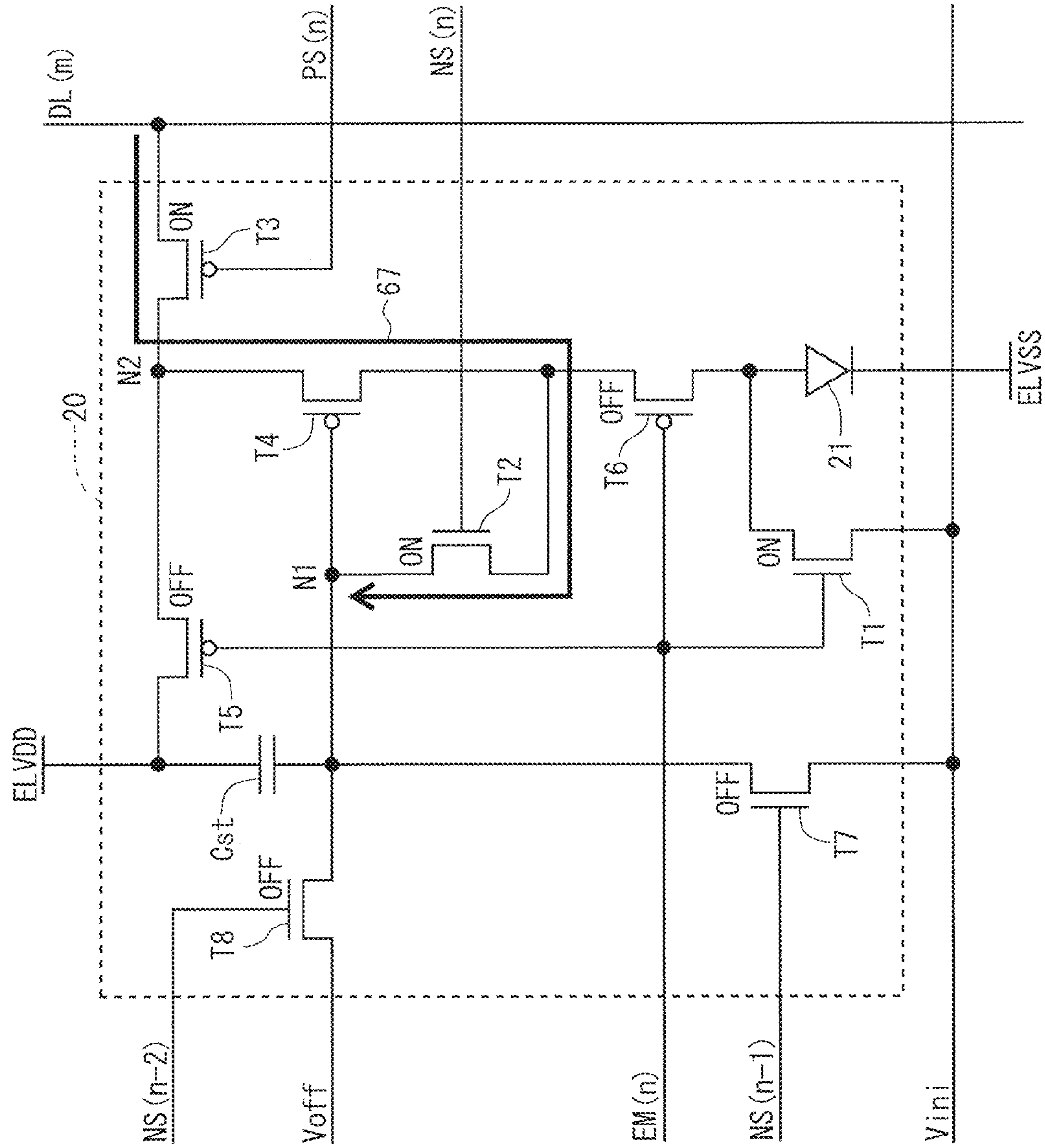
FIG. 14 is a diagram for describing operation of the pixel circuit during a writing period in the first example.

At time point t16, the first scanning signal NS(n) changes from low level to high level. By this, the threshold voltage compensation transistor T2 goes into on state. At time point t17, the second scanning signal PS(n) changes from high level to low level. By this, the write control transistor T3 goes into on state. Thus, as indicated by an arrow given reference character 67 in FIG. 14, a data signal (data voltage) DL(m) is provided to the first node N1 through the write control transistor T3, the drive transistor T4, and the threshold voltage compensation transistor T2. By thus providing, through the diode-connected drive transistor T4, a data voltage to the control terminal of the drive transistor T4, as in the comparative example, when a drive current is supplied to the organic EL element 21 during the light-emission period 15, variations in the threshold voltage of the drive transistor T4 are compensated for. At time point t18, the second scanning signal PS(n) changes from low level to high level. By this, the write control transistor T3 goes into off state. At time point t19, the first scanning signal NS(n) changes from high level to low level. By this, the threshold voltage compensation transistor T2 goes into off state. Note that a period from time point t16 to time point t19 in FIG. 10 corresponds to the writing period 14 in FIG. 1.

At time point t20, the light-emission control signal EM(n) changes from high level to low level, by which the first light-emission control transistor T5 and the second light-emission control transistor T6 go into on state. By this, a drive current flows as indicated by the arrow given reference character 64 in FIG. 11, by which the organic EL element 21 emits light based on the magnitude of the drive current.

Thereafter, in the non-refresh frame period NRF, at time point t22, the light-emission control signal EM(n) changes from low level to high level. By this, the first light-emission control transistor T5 and the second light-emission control transistor T6 go into off state, by which the organic EL element 21 goes into turn-off state. Note that a period from time point t20 to time point t22 in FIG. 10 corresponds to the light-emission period 15 in FIG. 1.

During a period (turn-off period) from time point t22 to time point t23, the first light-emission control transistor T5 and the second light-emission control transistor T6 are maintained in off state, and thus, the organic EL element 21 is maintained in turn-off state. In addition, driving of the first scanning signal lines NS and the second scanning signal line PS also stops, and thus, the threshold voltage compensation transistor T2, the write control transistor T3, the second initialization transistor T7, and the off-voltage application transistor T8 are maintained in off state.

At time point t23, the light-emission control signal EM(n) changes from high level to low level, by which the first light-emission control transistor T5 and the second light-emission control transistor T6 go into on state. By this, a drive current flows as indicated by the arrow given reference character 64 in FIG. 11, by which the organic EL element 21 emits light based on the magnitude of the drive current. Note that a period after time point t23 in FIG. 10 corresponds to the light-emission period 16 in FIG. 1.

In the present embodiment, a light-emission stopping step is implemented by operation performed at time point t11, an off-voltage applying step is implemented by operation performed during the period from time point t12 to time point t13, an initializing step is implemented by operation performed during the period from time point t14 to time point t15, a data voltage writing step is implemented by operation performed during the period from time point t16 to time point t19, and a light-emission resuming step is implemented by operation performed at time point t20.

<1.5 Effects>

Figure 15:
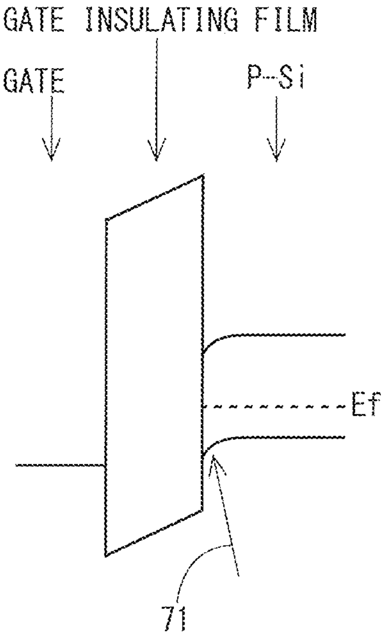
FIG. 15 is an energy band diagram for describing a state of a drive transistor when a high-level voltage is provided to a control terminal of the drive transistor in the first embodiment.
Figure 16:
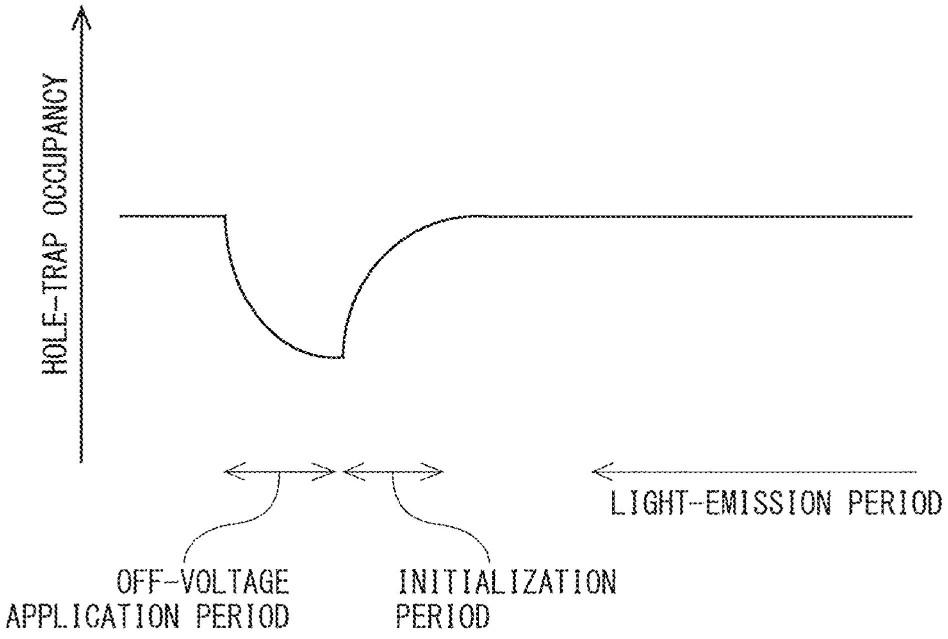
FIG. 16 is a diagram showing changes in hole-trap occupancy in a channel of the drive transistor in the first embodiment.
Figure 17:
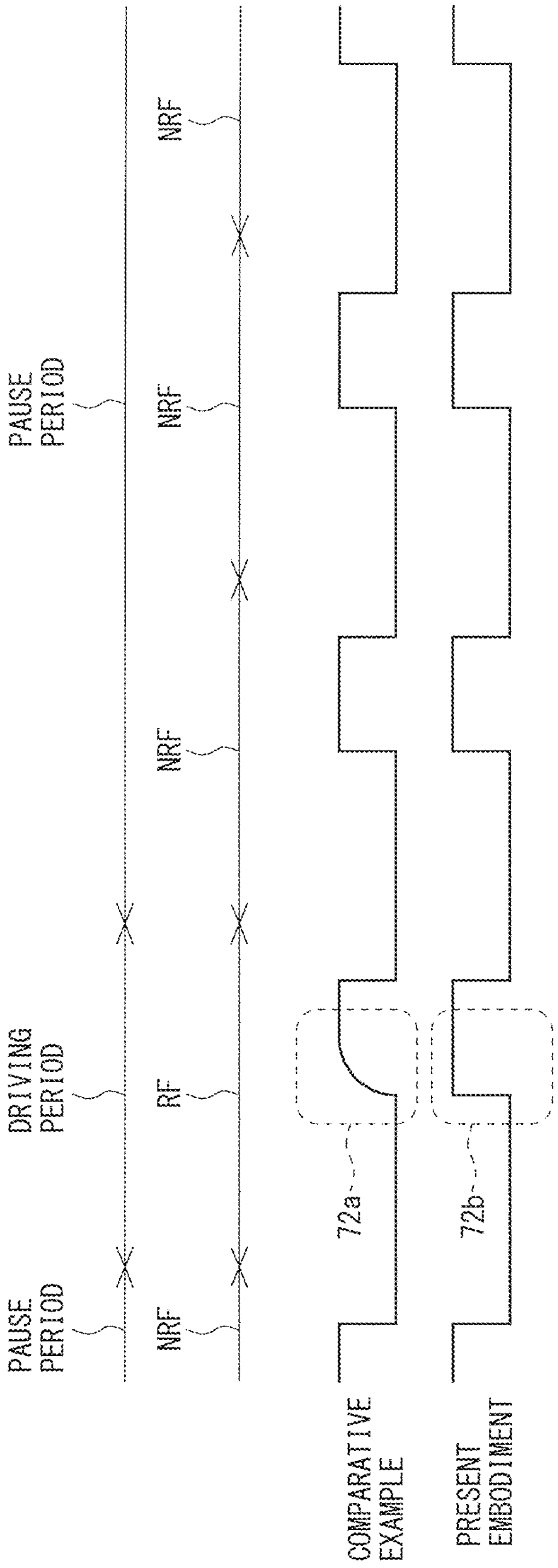
FIG. 17 is a waveform diagram for describing effects of the first embodiment.

According to the present embodiment, the pixel circuit 20 of the organic EL display device that can operate in the pause driving mode is provided with the off-voltage application transistor T8 for providing a control voltage Voff that brings the drive transistor T4 into off state to the control terminal of the drive transistor T4. In a refresh frame period RF when the organic EL display device operates in the pause driving mode, before a data voltage is provided to the control terminal of the drive transistor T4 through the diode-connected drive transistor T4, the control voltage Voff is provided to the control terminal of the drive transistor T4 through the off-voltage application transistor T8, and then an initialization voltage Vini that brings the drive transistor T4 into on state is provided to the control terminal of the drive transistor T4. As to this, when the control voltage Voff which is a high-level voltage is provided to the control terminal of the drive transistor T4, the energy band regarding the drive transistor T4 bends as shown in FIG. 15. At this time, hole de-trapping proceeds near the channel of the drive transistor T4 (see a portion indicated by an arrow given reference character 71 in FIG. 15). That is the hole-trap occupancy in the channel remarkably decreases in the above-described off-voltage application period before the initialization period as shown in FIG. 16. In the initialization period, the initialization voltage Vini that brings the drive transistor T4 into on state is provided to the control terminal of the drive transistor T4, by which the hole-trap occupancy in the channel increases as shown in FIG. 16. As a result, in the refresh frame period RF, the hole-trap occupancy is maintained at a substantially constant value during the light-emission period as shown in FIG. 16. Therefore, there is almost no change in luminance in the light-emission period in the refresh frame period RF. As to this, in the comparative example, the waveform of luminance is rounded in the driving period as shown in a portion given reference character 72*a* in FIG. 17, resulting in different waveforms of luminance between the driving period and the pause period, and thus, flicker is visually recognized. On the other hand, in the present embodiment, there is almost no change in luminance in the light-emission period in the refresh frame period RF as described above, and thus, the waveform of luminance is not rounded as shown in a portion given reference character 72*b* in FIG. 17. Thus, a luminance waveform in the driving period and a luminance waveform in the pause period are identical, suppressing occurrence of flicker. In addition, unlike the technique disclosed in US 2020/0118487 A1, since a state in which the operation of the drive transistor T4 stops is maintained during the pause period, there is no increase in power consumption. As such, according to the present embodiment, it becomes possible to suppress occurrence of flicker upon pause driving while suppressing an increase in power consumption in the organic EL display device.

<1.6 Variants>

Variants of the first embodiment will be described.

<1.6.1 First Variant>

Figure 18:
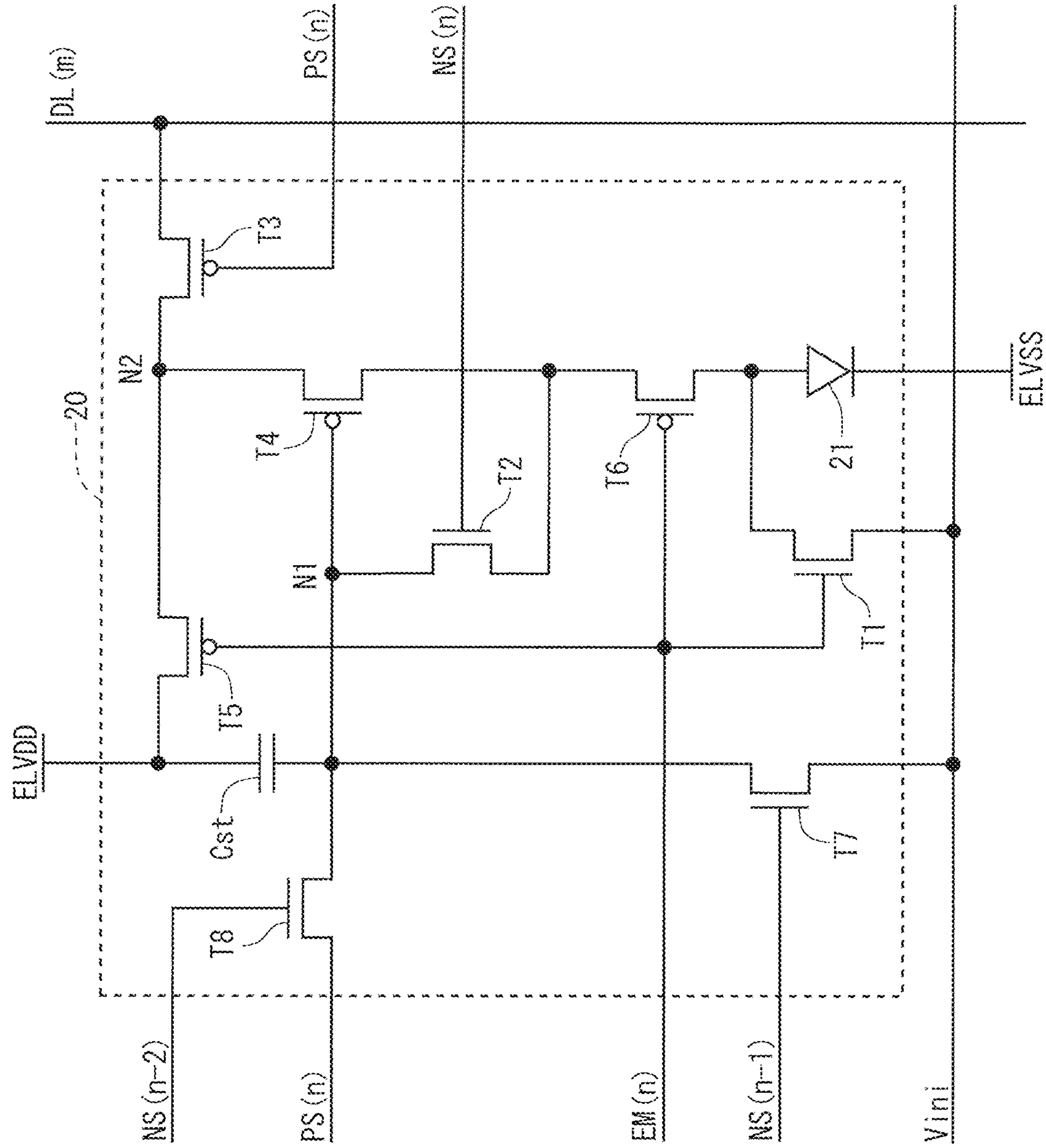
FIG. 18 is a circuit diagram showing a configuration of a pixel circuit in a first variant of the first embodiment.

FIG. 18 is a circuit diagram showing a configuration of a pixel circuit 20 in an nth row and an mth column in a first variant of the first embodiment. In the present variant, the first conductive terminal of the off-voltage application transistor T8 is connected to the second scanning signal line PS(n) in the nth row. Thus, the same signal is provided to the first conductive terminal of the off-voltage application transistor T8 and the control terminal of the write control transistor T3. In other words, the first conductive terminal of the off-voltage application transistor T8 is connected to the control terminal of the write control transistor T3.

As can be grasped from FIG. 10, during a period during which the off-voltage application transistor T8 is in on state (the period from time point t12 to time point t13), the second scanning signal PS(n) is maintained at high level. Thus, during the period during which the off-voltage application transistor T8 is in on state, a high-level voltage is provided to the control terminal of the drive transistor T4 (i.e., positive Vgs stress is provided to the drive transistor T4). By this, the pixel circuit 20 in the present variant operates in the same manner as the pixel circuit 20 in the first embodiment. Note that in the present variant, a first-level voltage is implemented by a low-level second scanning signal PS(n), and a second-level voltage is implemented by a high-level second scanning signal PS(n).

According to the present variant, the same effects as those in the first embodiment are obtained. In addition, since the second scanning signal line PS which is an existing wiring line is used as a wiring line for providing positive Vgs stress to the drive transistor T4, an increase in definition is easily achieved compared to the first embodiment.

<1.6.2 Second Variant>

Figure 19:
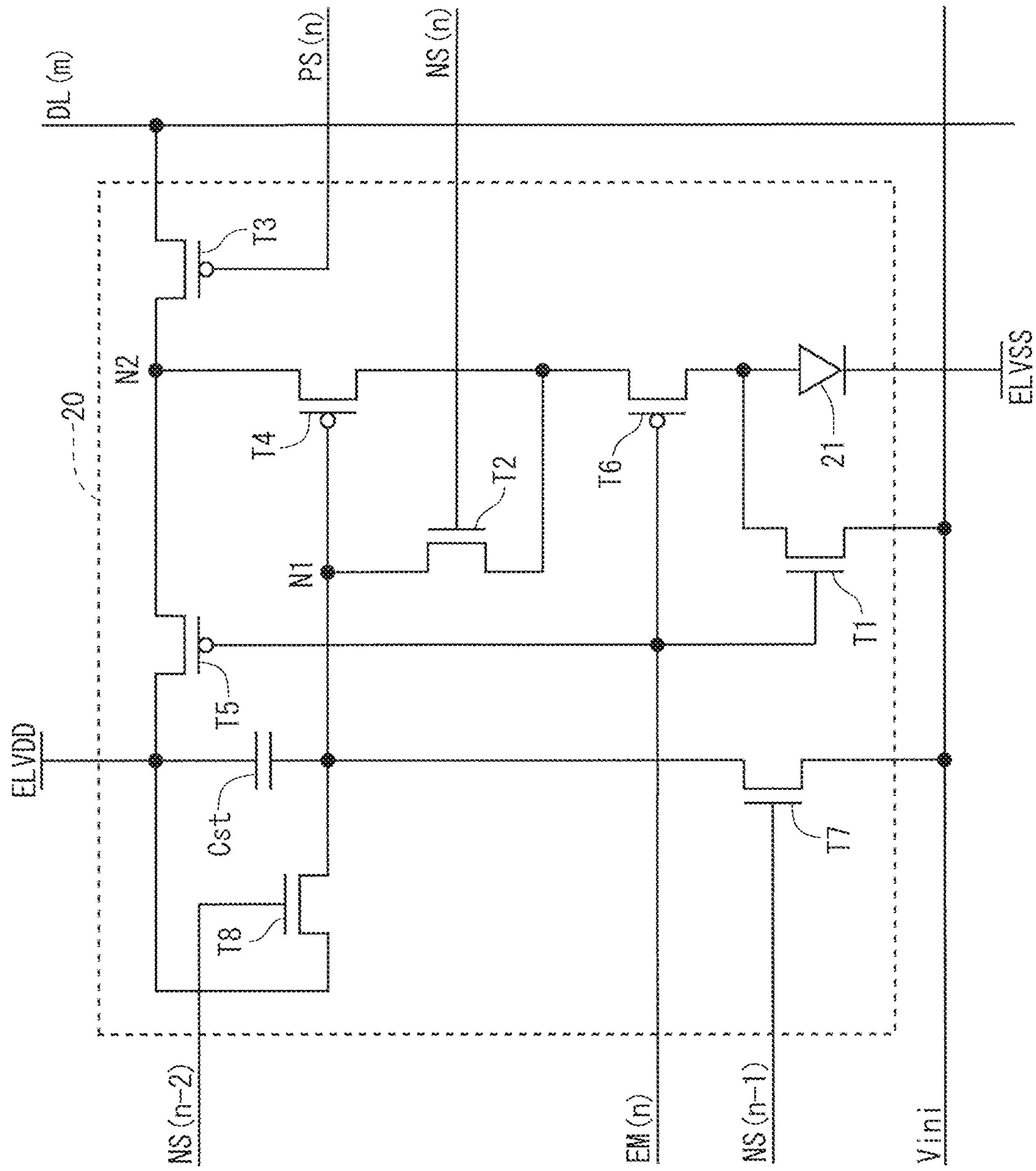
FIG. 19 is a circuit diagram showing a configuration of a pixel circuit in a second variant of the first embodiment.

FIG. 19 is a circuit diagram showing a configuration of a pixel circuit 20 in an nth row and an mth column in a second variant of the first embodiment. In the present variant, the first conductive terminal of the off-voltage application transistor T8 is connected to the high-level power line. Since a high-level power supply voltage ELVDD is applied to the high-level power line, a high-level voltage is provided to the control terminal of the drive transistor T4 (i.e., positive Vgs stress is provided to the drive transistor T4) during the period during which the off-voltage application transistor T8 is in on state, also in the present variant. By this, the pixel circuit 20 of the present variant operates in the same manner as the pixel circuit 20 in the first embodiment.

According to the present variant, the same effects as those in the first embodiment are obtained. In addition, since the high-level power line which is an existing wiring line is used as a wiring line for providing positive Vgs stress to the drive transistor T4, an increase in definition is easily achieved compared to the first embodiment.

2. Second Embodiment

A second embodiment will be described. Note that description of the same points as those of the first embodiment is omitted as appropriate.

<2.1 Overall Configuration>

An overall configuration is substantially the same as that of the first embodiment. Note, however, that in the present embodiment, the control-voltage power line (a power line for supplying the control voltage Voff) is not disposed in the display unit 200, and i reset control signal lines Voi(1) to Voi(i) each for providing a voltage (off-voltage) that brings the drive transistor T4 into off state and a voltage (initialization voltage) that initializes the drive transistor T4 to the first node N1 are disposed in the display unit 200. In addition, the organic EL display device has a reset control signal line driver (reset control signal line drive circuit) that drives the i reset control signal lines Voi(1) to Voi(i). A high-level voltage and a low-level voltage are alternately applied as a reset control signal to each reset control signal line Voi. In the following description, when necessary, the reset control signal is also given reference character Voi.

<2.2 Configuration of the Pixel Circuits>

Figure 20:
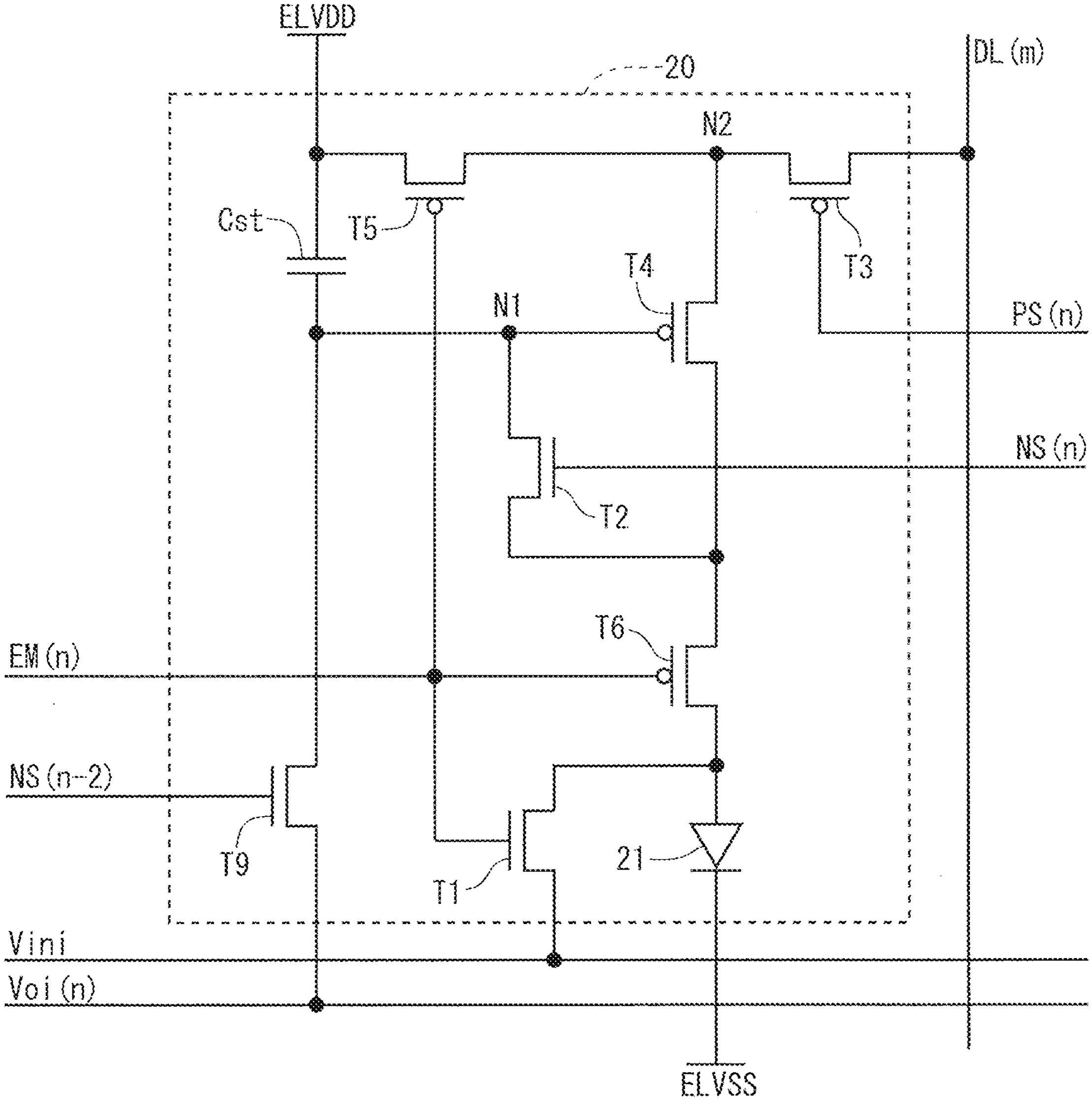
FIG. 20 is a circuit diagram showing a configuration of a pixel circuit in a second embodiment.

FIG. 20 is a circuit diagram showing a configuration of a pixel circuit 20 in an nth row and an mth column in the present embodiment. The pixel circuit 20 in the present embodiment is provided with a reset transistor T9 instead of the second initialization transistor T7 and the off-voltage application transistor T8 in the first embodiment. That is, the pixel circuit 20 in the present embodiment includes one organic EL element (organic light-emitting diode) 21 serving as a display element; seven transistors T1 to T6 and T9 (the first initialization transistor T1, the threshold voltage compensation transistor T2, the write control transistor T3, the drive transistor T4, the first light-emission control transistor T5, the second light-emission control transistor T6, and the reset transistor T9); and one holding capacitor Cst. The reset transistor T9 is connected at its control terminal to the first scanning signal line NS(n−2) in the (n−2)th row, connected at its first conductive terminal to the second conductive terminal of the threshold voltage compensation transistor T2, the control terminal of the drive transistor T4, and the second electrode of the holding capacitor Cst, and connected at its second conductive terminal to a reset control signal line Voi(n) in the nth row. Note that the reset transistor T9 is an N-channel IGZO-TFT and operates as a switching element.

<2.3 Driving Method>

Figure 21:
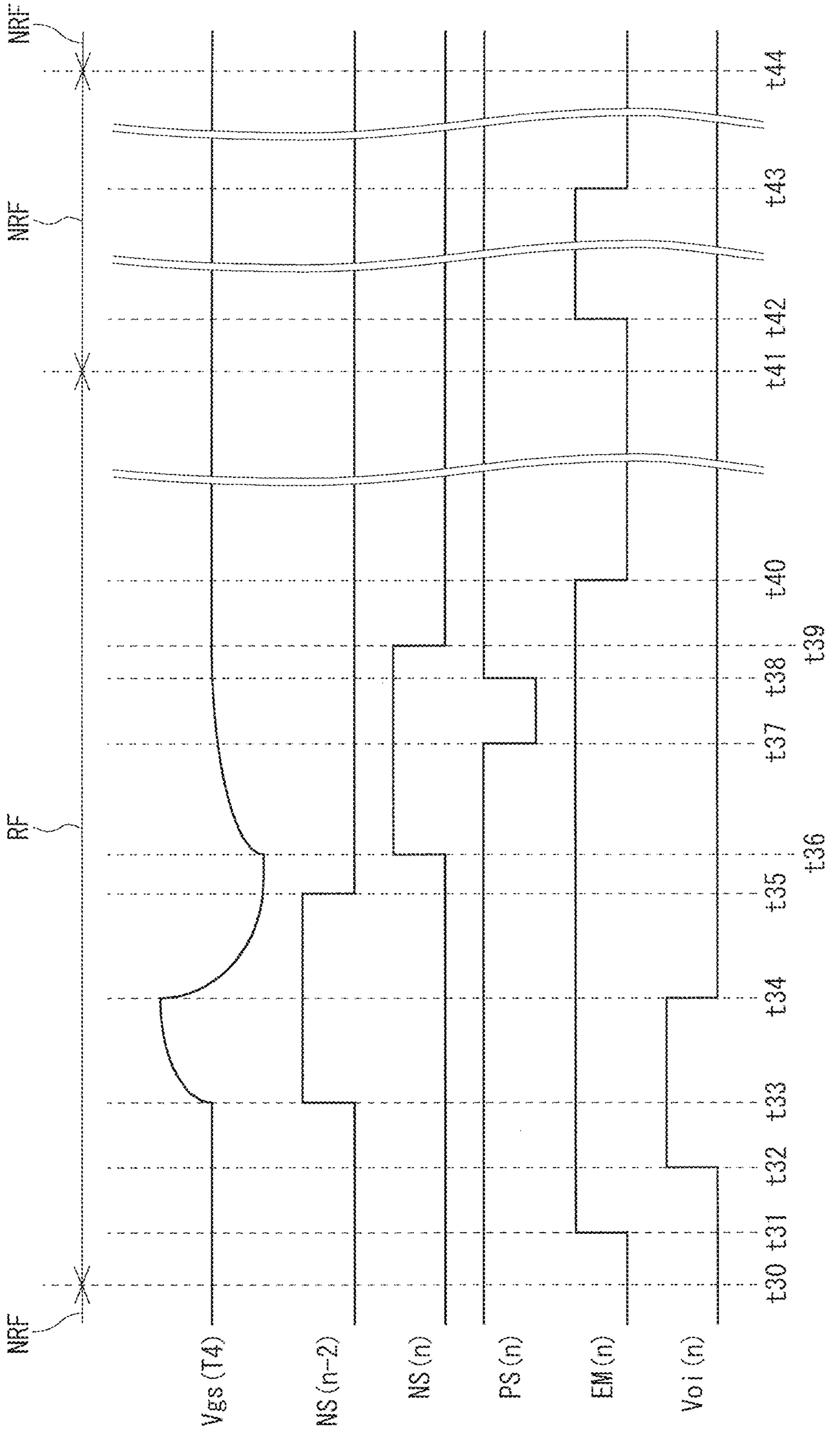
FIG. 21 is a waveform diagram for describing operation of the pixel circuit when an organic EL display device operates in the pause driving mode in the second embodiment.

With reference to FIG. 21, operation of the pixel circuit 20 when the organic EL display device operates in the pause driving mode in the present embodiment will be described. In FIG. 21, a period from time point t30 to time point t41 is a refresh frame period RF, and a period from time point t41 to time point t44 is a non-refresh frame period NRF. Note that although the pulse width of the first scanning signal NS corresponds to one horizontal scanning period in the first embodiment, the pulse width of the first scanning signal NS corresponds to two horizontal scanning periods in the present embodiment. Note also that the high-level reset control signal Voi corresponds to a voltage (off-voltage) that brings the drive transistor T4 into off state, and the low-level reset control signal Voi corresponds to a voltage (initialization voltage) that initializes the drive transistor T4.

During a period from time point t30 which is the time of starting the refresh frame period RF to time point t31, as with the period from time point t10 to time point t11 in the first embodiment, a drive current based on writing of a data voltage performed in the last refresh frame period RF flows, by which the organic EL element 21 emits light based on the magnitude of the drive current. At time point t31, as with time point t11 in the first embodiment, the anode potential is initialized based on the initialization voltage Vini.

At time point t32, the reset control signal Voi(n) changes from low level to high level. At this time, since the first scanning signal NS(n−2) is maintained at low level, the reset transistor T9 is maintained in off state. Thus, there is no change in the potential at the first node N1 around time point t32.

At time point t33, the first scanning signal NS(n−2) changes from low level to high level. By this, the reset transistor T9 goes into on state, by which the reset control signal Voi is provided to the first node N1. At this time, the reset control signal Voi is at high level. Thus, the potential at the first node N1 increases, increasing the gate-source voltage Vgs(T4) of the drive transistor T4. In this manner, a voltage (off-voltage) that brings the drive transistor T4 into off state is provided to the control terminal of the drive transistor T4.

At time point t34, the reset control signal Voi(n) changes from high level to low level. At this time, since the first scanning signal NS(n−2) is maintained at high level, the reset transistor T9 is maintained in on state. By this, the potential at the first node N1 is initialized based on the low-level voltage. Specifically, the potential at the first node N1 sufficiently decreases, and accordingly, the gate-source voltage Vgs(T4) of the drive transistor T4 sufficiently decreases. At time point t35, the first scanning signal NS(n−2) changes from high level to low level. By this, the reset transistor T9 goes into off state.

At time point t36, the first scanning signal NS(n) changes from low level to high level. By this, the threshold voltage compensation transistor T2 goes into on state. At time point t37, the second scanning signal PS(n) changes from high level to low level. By this, the write control transistor T3 goes into on state. Thus, a data signal (data voltage) DL(m) is provided to the first node N1 through the write control transistor T3, the drive transistor T4, and the threshold voltage compensation transistor T2. By thus providing a data voltage to the control terminal of the drive transistor T4 through the diode-connected drive transistor T4, as in the comparative example and the first embodiment, when a drive current is supplied to the organic EL element 21, variations in the threshold voltage of the drive transistor T4 are compensated for. At time point t38, the second scanning signal PS(n) changes from low level to high level. By this, the write control transistor T3 goes into off state. At time point t39, the first scanning signal NS(n) changes from high level to low level. By this, the threshold voltage compensation transistor T2 goes into off state.

Operation performed after time point t40 is the same as that performed after time point t20 in the first embodiment.

In the present embodiment, a light-emission stopping step is implemented by operation performed at time point t31, an off-voltage applying step is implemented by operation performed during a period from time point t33 to time point t34, an initializing step is implemented by operation performed during a period from time point t34 to time point t35, a data voltage writing step is implemented by operation performed during a period from time point t36 to time point t39, and a light-emission resuming step is implemented by operation performed at time point t40.

<2.4 Effects>

According to the present embodiment, the pixel circuit 20 of the organic EL display device that can operate in the pause driving mode is provided with the reset transistor T9 having a control terminal connected to the first scanning signal line NS; a first conductive terminal connected to the control terminal of the drive transistor T4; and a second conductive terminal connected to the reset control signal line Voi to which a high-level voltage and a low-level voltage are alternately applied. In a refresh frame period RF when the organic EL display device operates in the pause driving mode, before a data voltage is provided to the control terminal of the drive transistor T4 through the diode-connected drive transistor T4, a high-level voltage is provided to the control terminal of the drive transistor T4 through the reset transistor T9, and then a low-level voltage is provided to the control terminal of the drive transistor T4. By this, as in the first embodiment, a luminance waveform in the driving period and a luminance waveform in the pause period are identical, suppressing occurrence of flicker. In addition, as in the first embodiment, since a state in which the operation of the drive transistor T4 stops is maintained during the pause period, there is no increase in power consumption. As such, according to the present embodiment, it becomes possible to suppress occurrence of flicker upon pause driving while suppressing an increase in power consumption in the organic EL display device. In addition, the number of transistors included in the pixel circuit 20 is seven, and a single wiring line is used in a shared manner as a wiring line for transmitting a voltage (off-voltage) that brings the drive transistor T4 into off state and as a wiring line for transmitting a voltage (initialization voltage) that initializes the drive transistor T4, and thus, an increase in definition is easily achieved compared to the first embodiment.

<2.5 Variant>

Figure 22:
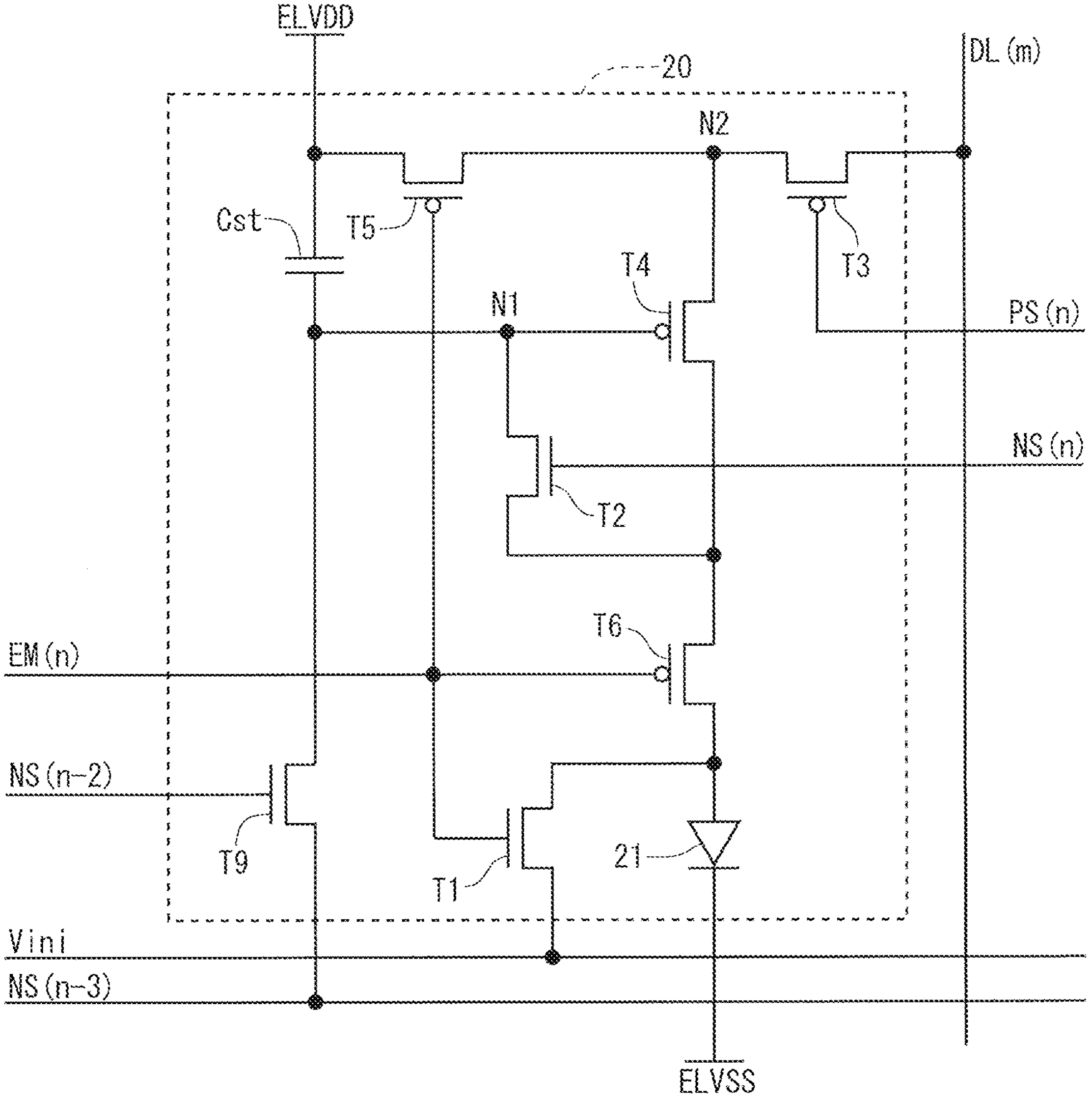
FIG. 22 is a circuit diagram showing a configuration of a pixel circuit in a variant of the second embodiment.

A variant of the second embodiment will be described. FIG. 22 is a circuit diagram showing a configuration of a pixel circuit 20 in an nth row and an mth column in the variant of the second embodiment. In the present variant, the second conductive terminal of the reset transistor T9 is connected to a first scanning signal line NS(n−3) in an (n−3)th row. Thus, in the present variant, the reset control signal lines Voi and the reset control signal line driver are not necessary.

Figure 23:
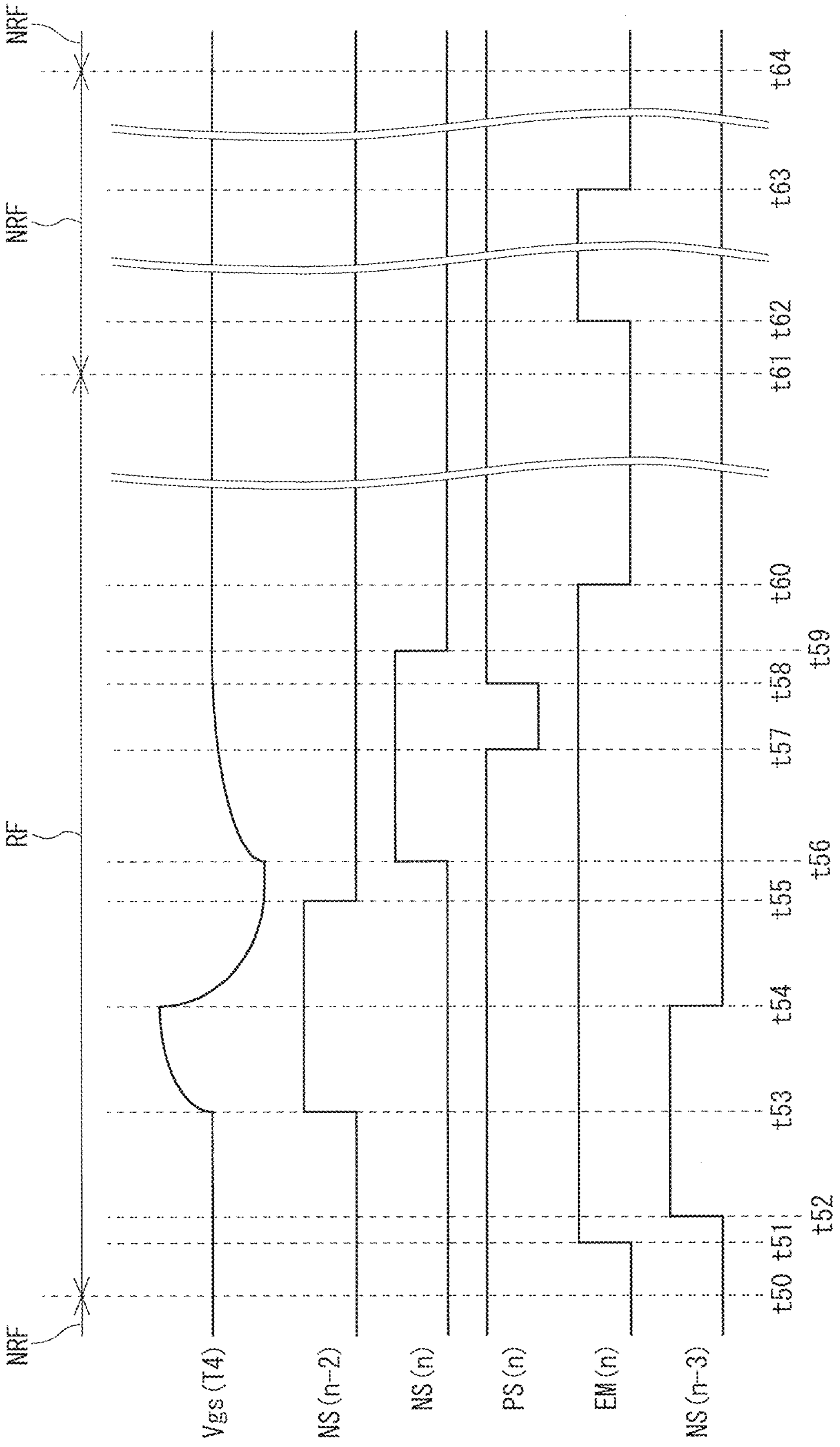
FIG. 23 is a waveform diagram for describing operation of the pixel circuit when an organic EL display device operates in the pause driving mode in the variant of the second embodiment.

With reference to FIG. 23, operation of the pixel circuit 20 when the organic EL display device operates in the pause driving mode in the present variant will be described. In FIG. 23, a period from time point t50 to time point t61 is a refresh frame period RF, and a period from time point t61 to time point t64 is a non-refresh frame period NRF.

Operation performed during a period before time point t52 is the same as that performed during a period before time point t32 in the second embodiment. At time point t52, the first scanning signal NS(n−3) changes from low level to high level. At this time, since the first scanning signal NS(n−2) is maintained at low level, the reset transistor T9 is maintained in off state. Thus, there is no change in the potential at the first node N1 around time point t52.

At time point t53, the first scanning signal NS(n−2) changes from low level to high level. By this, the reset transistor T9 goes into on state, by which the first scanning signal NS(n−3) is provided to the first node N1. At this time, the first scanning signal NS(n−3) is at high level. Thus, the potential at the first node N1 increases, increasing the gate-source voltage Vgs(T4) of the drive transistor T4. In this manner, a voltage (off-voltage) that brings the drive transistor T4 into off state is provided to the control terminal of the drive transistor T4.

At time point t54, the first scanning signal NS(n−3) changes from high level to low level. At this time, since the first scanning signal NS(n−2) is maintained at high level, the reset transistor T9 is maintained in on state. By this, the potential at the first node N1 is initialized based on the low-level voltage. Specifically, the potential at the first node N1 sufficiently decreases, and accordingly, the gate-source voltage Vgs(T4) of the drive transistor T4 sufficiently decreases. Operation performed after time point t55 is the same as that performed after time point t35 in the second embodiment.

According to the present variant, the same effects as those in the second embodiment are obtained. In addition, since the first scanning signal lines NS are used instead of the reset control signal lines Voi in the second embodiment, a driver for driving the reset control signal lines Voi is unnecessary. Thus, narrowing of a picture-frame is easily achieved compared to the second embodiment.

3. Summary

Figure 24:
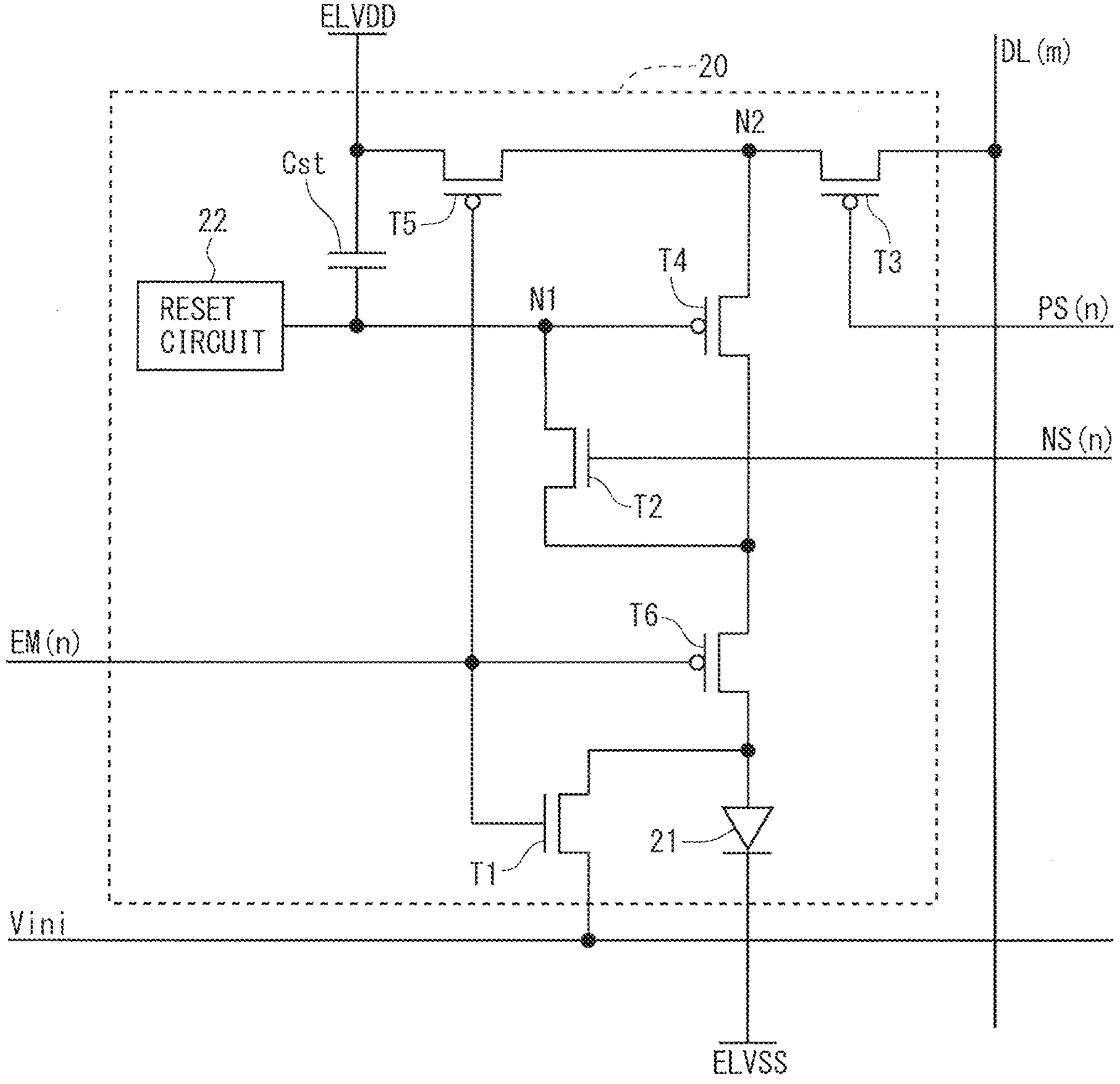
FIG. 24 is a diagram showing a configuration of a pixel circuit for all embodiments and all variants.

All embodiments and all variants will be summarized. A configuration of a pixel circuit 20 in an nth row and an mth column is represented as shown in FIG. 24. That is, the pixel circuit 20 includes an organic EL element 21, six transistors T1 to T6, a holding capacitor Cst, and a reset circuit 22. In a period, during which the first light-emission control transistor T5 and the second light-emission control transistor T6 are maintained in off state, in a refresh frame period RF included in a driving period, before a data voltage is provided to a first node N1 through the write control transistor T3, the drive transistor T4, and the threshold voltage compensation transistor T2, the reset circuit 22 provides an initialization voltage that brings the drive transistor T4 into on state to the first node N1 after providing an off-voltage that brings the drive transistor T4 into off state to the first node N1.

In addition, for all embodiments and all variants, in the refresh frame period RF included in the driving period, the display control circuit 100 controls the display drive circuit (the gate driver 300, the emission driver 400, and the source driver 500) such that the initialization voltage is provided to the first node N1 by the reset circuit 22 after the off-voltage is provided to the first node N1 by the reset circuit 22, before a data voltage is provided to the first node N1 through the write control transistor T3, the drive transistor T4, and the threshold voltage compensation transistor T2.

In addition, for all embodiments and all variants, in a period, during which the first light-emission control transistor T5 and the second light-emission control transistor T6 are maintained in off state, in a refresh frame period RF included in a driving period, the gate driver 300 drives the (i+2) first scanning signal lines NS(−1) to NS(i) and the i second scanning signal lines PS(1) to PS(i) such that the threshold voltage compensation transistor T2 changes from on state to off state after a certain period has elapsed since the threshold voltage compensation transistor T2 changes from off state to on state and the write control transistor T3 is maintained in on state during at least a part of a period during which the threshold voltage compensation transistor T2 is maintained in on state.

Figure 25:
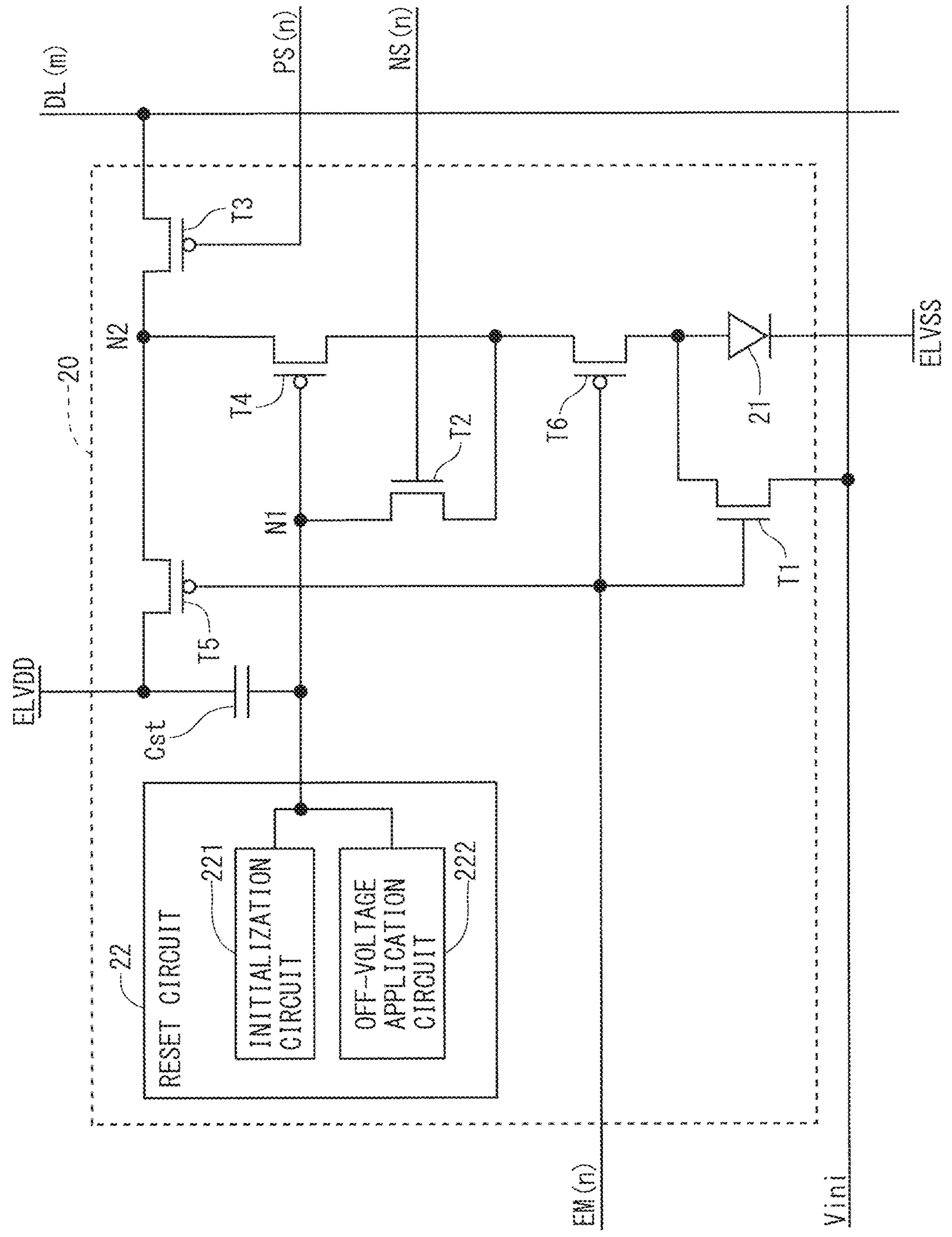
FIG. 25 is a diagram for describing a reset circuit in the first embodiment (including the first variant and the second variant).
Figure 26:
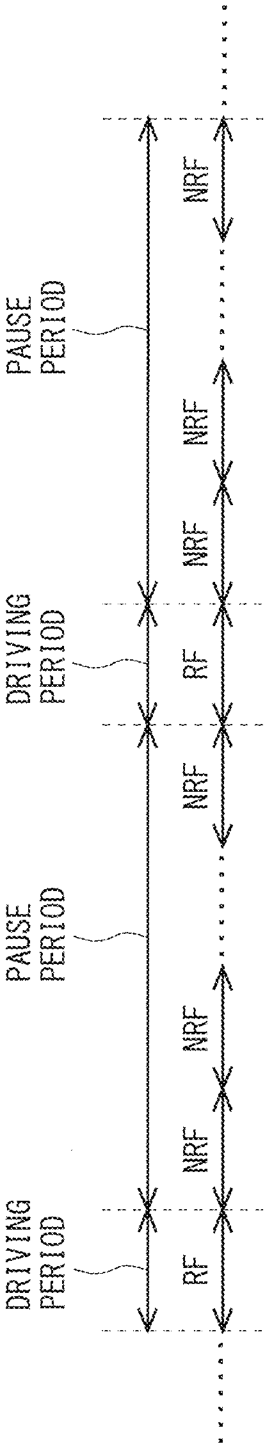
FIG. 26 is a diagram for describing pause driving.
Figure 27:
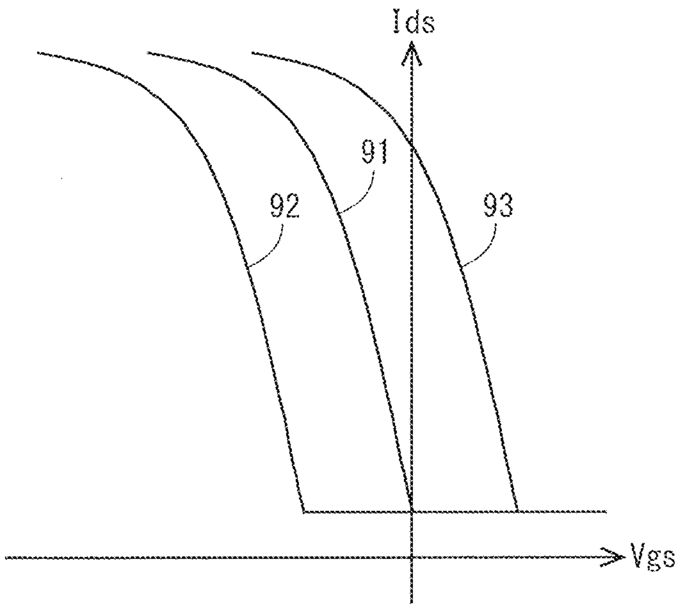
FIG. 27 is a diagram for describing virtual IV characteristics taking into account the hole trap level in the drive transistor.
Figure 28:
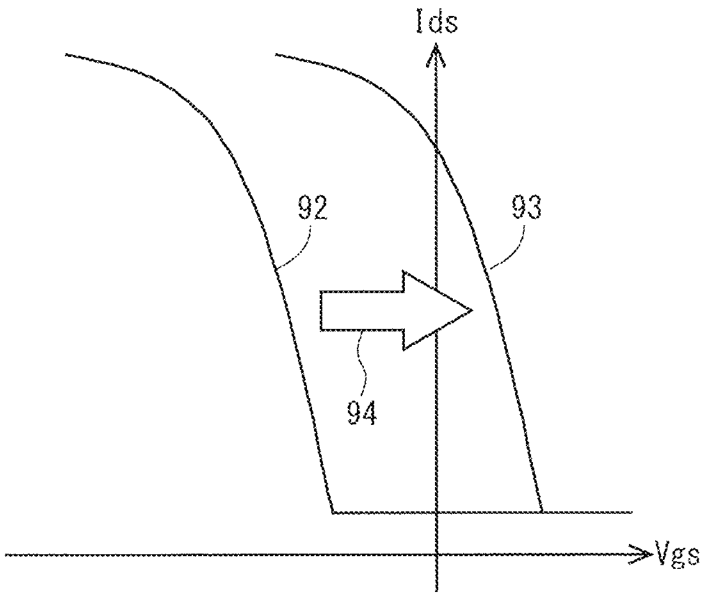
FIG. 28 is a diagram for describing a change in IV characteristic.
Figure 29:
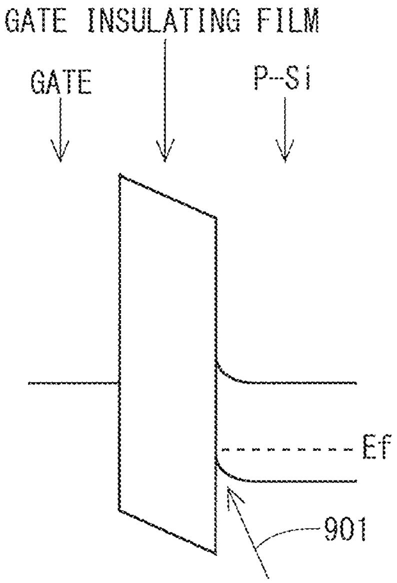
FIG. 29 is an energy band diagram for describing influence exerted by initialization of the drive transistor.
Figure 30:
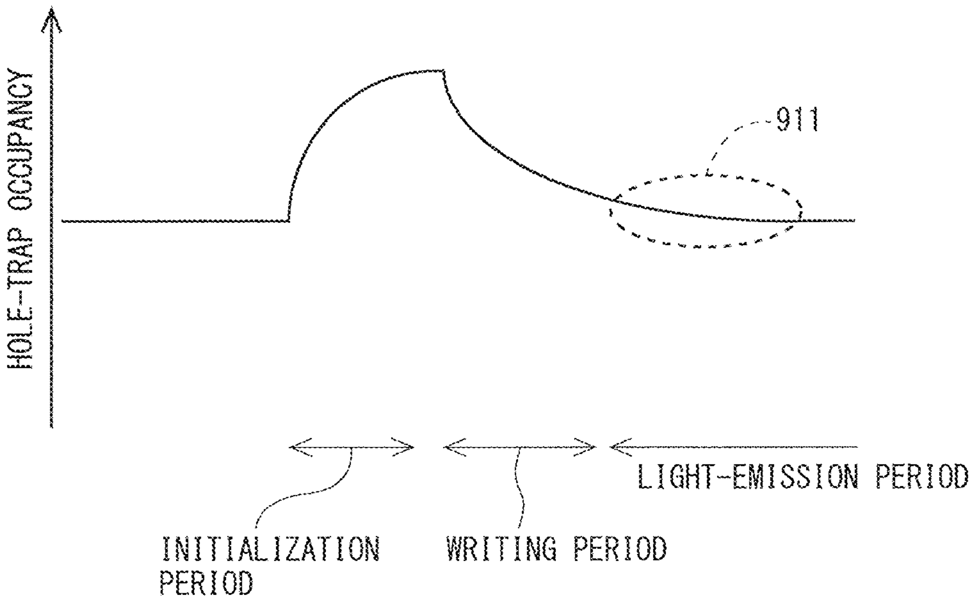
FIG. 30 is a diagram showing changes in hole-trap occupancy in a channel of a drive transistor in a known example.
Figure 31:
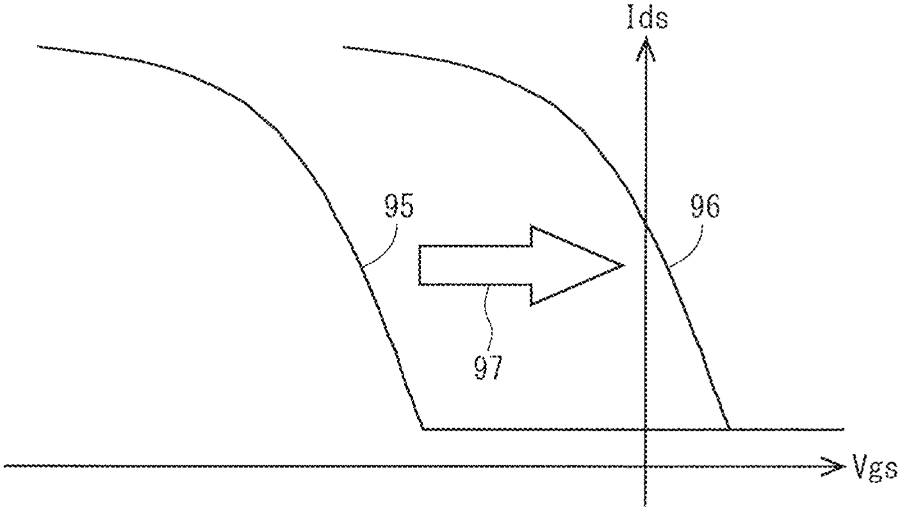
FIG. 31 is a diagram for describing a change in IV characteristic during a light-emission period in the known example.
Figure 32:
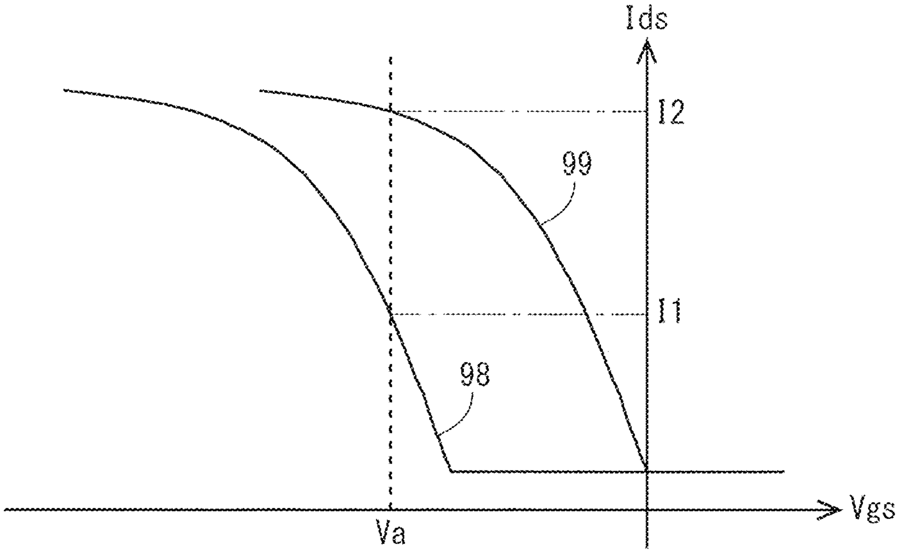
FIG. 32 is a diagram for describing an increase in luminance during the light-emission period in the known example.
Figure 33:
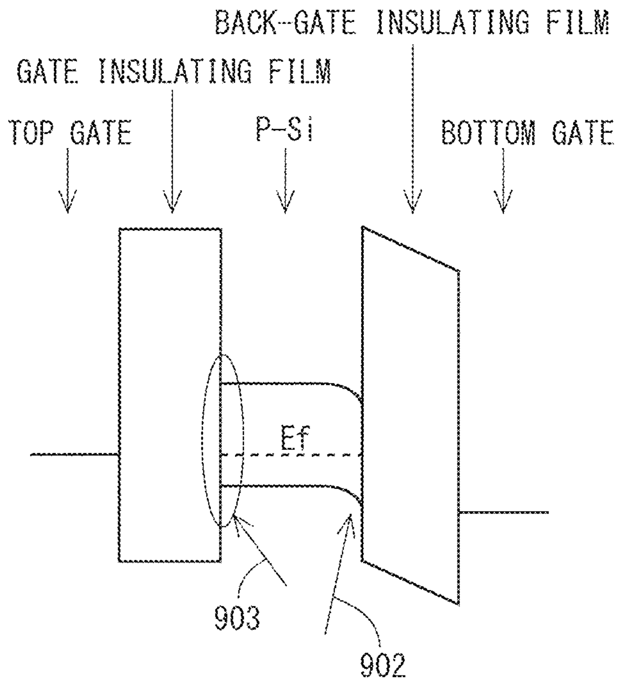
FIG. 33 is a diagram for describing a technique disclosed in US 2020/0243017 A1.
Figure 34:
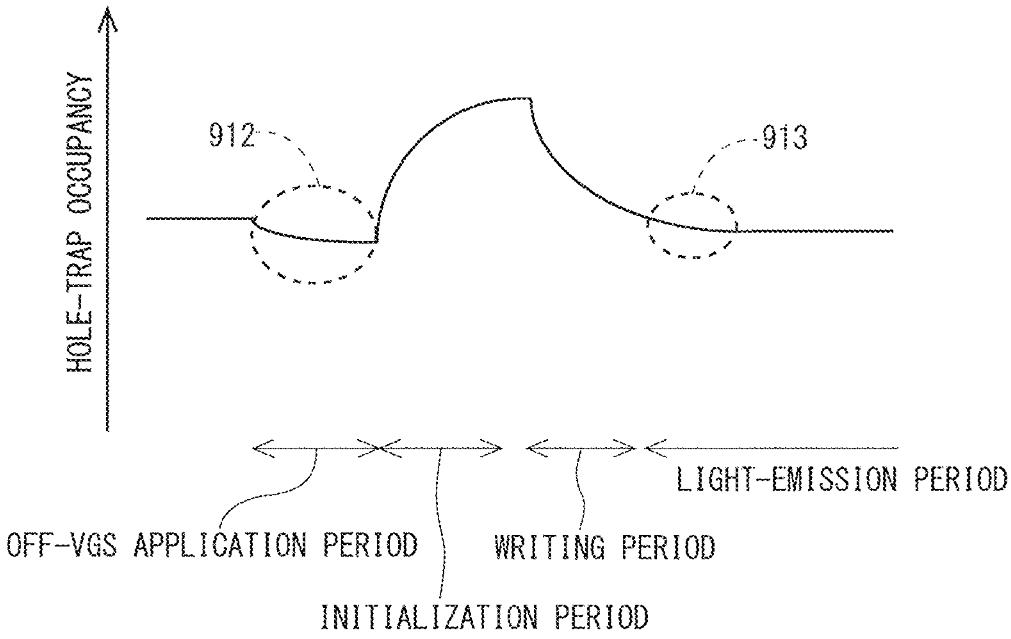
FIG. 34 is a diagram for describing the technique disclosed in US 2020/0243017 A1.

For the first embodiment (including the variants), as shown in FIG. 25, the reset circuit 22 includes an initialization circuit 221 for providing the initialization voltage to the first node N1; and an off-voltage application circuit 222 for providing the off-voltage (a voltage that brings the drive transistor T4 into off state) to the first node N1.

In addition, for the first embodiment (including the variants), in the refresh frame period RF included in the driving period, the gate driver 300 drives the (i+2) first scanning signal lines NS(−1) to NS(i) such that the off-voltage application transistor T8 changes from off state to on state after the first light-emission control transistor T5 and the second light-emission control transistor T6 change from on state to off state; the second initialization transistor T7 changes from off state to on state after the off-voltage application transistor T8 changes from on state to off state; the threshold voltage compensation transistor T2 changes from off state to on state after the second initialization transistor T7 changes from on state to off state; and the threshold voltage compensation transistor T2 changes from on state to off state before the first light-emission control transistor T5 and the second light-emission control transistor T6 change from off state to on state.

For the first embodiment (see FIG. 3), the initialization circuit 221 includes the second initialization transistor T7, and the off-voltage application circuit 222 includes the off-voltage application transistor T8. The first conductive terminal of the off-voltage application transistor T8 is provided with a control voltage Voff which is a constant voltage.

In such a configuration, in the refresh frame period RF included in the driving period, a constant voltage (control voltage Voff) is provided as the off-voltage to the first node N1 by the off-voltage application transistor T8 going into on state, and then the initialization voltage is provided to the first node N1 by the second initialization transistor T7 going into on state.

For the first variant (see FIG. 18) of the first embodiment, the initialization circuit 221 includes the second initialization transistor T7, and the off-voltage application circuit 222 includes the off-voltage application transistor T8. The first conductive terminal of the off-voltage application transistor T8 is provided with the second scanning signal PS. That is, a first-level voltage (low-level voltage) that brings the write control transistor T3 into on state and a second-level voltage (high-level voltage) that brings the write control transistor T3 into off state are alternately provided to the first conductive terminal of the off-voltage application transistor T8. In such a configuration, in the refresh frame period RF included in the driving period, the second-level voltage is provided as the off-voltage to the first node N1 by the off-voltage application transistor T8 going into on state, and then the initialization voltage is provided to the first node N1 by the second initialization transistor T7 going into on state.

In addition, for the first variant of the first embodiment, the gate driver 300 drives the (i+2) first scanning signal lines NS(−1) to NS(i) such that the off-voltage is provided to the first conductive terminal of the off-voltage application transistor T8 during a period during which the off-voltage application transistor T8 is maintained in on state.

For the second variant (see FIG. 19) of the first embodiment, the initialization circuit 221 includes the second initialization transistor T7, and the off-voltage application circuit 222 includes the off-voltage application transistor T8. The first conductive terminal of the off-voltage application transistor T8 is provided with the high-level power supply voltage ELVDD. In such a configuration, in the refresh frame period RF included in the driving period, the high-level power supply voltage ELVDD is provided as the off-voltage to the first node N1 by the off-voltage application transistor T8 going into on state, and then the initialization voltage is provided to the first node N1 by the second initialization transistor T7 going into on state.

For the second embodiment (including the variant), as shown in FIGS. 20 and 22, the reset circuit 22 includes a reset transistor T9 having a control terminal; a first conductive terminal connected to the first node N1; and a second conductive terminal to which a first-level voltage corresponding to the initialization voltage and a second-level voltage corresponding to the off-voltage are alternately provided. In such a configuration, in the refresh frame period RF included in the driving period, the reset transistor T9 is maintained in on state during a part of a period during which the first light-emission control transistor T5 and the second light-emission control transistor T6 are maintained in off state. Then, the voltage provided to the second conductive terminal of the reset transistor T9 changes from the second-level voltage to the first-level voltage in a period during which the reset transistor T9 is maintained in on state, by which the first-level voltage is provided as the initialization voltage to the first node N1 after the second-level voltage is provided as the off-voltage to the first node N1.

For the second embodiment (excluding the variant), in the refresh frame period RF included in the driving period and the non-refresh frame period NRF included in the pause period, the emission driver 400 drives the i light-emission control lines EM(1) to EM(i) such that the first light-emission control transistor T5 and the second light-emission control transistor T6 change from off state to on state after a certain period has elapsed since the first light-emission control transistor T5 and the second light-emission control transistor T6 change from on state to off state. In addition, in the refresh frame period RF included in the driving period, the gate driver 300 drives the (i+2) first scanning signal lines NS(−1) to NS(i) such that the reset transistor T9 changes from off state to on state after the first light-emission control transistor T5 and the second light-emission control transistor T6 change from on state to off state; the threshold voltage compensation transistor T2 changes from off state to on state after the reset transistor T9 changes from on state to off state; and the threshold voltage compensation transistor T2 changes from on state to off state before the first light-emission control transistor T5 and the second light-emission control transistor T6 change from off state to on state. In addition, in the refresh frame period RF included in the driving period, the reset control signal line driver drives the i reset control signal lines Voi(1) to Voi(i) such that a voltage provided to the second conductive terminal of the reset transistor T9 changes from the first-level voltage to the second-level voltage after the first light-emission control transistor T5 and the second light-emission control transistor T6 change from on state to off state; and the voltage provided to the second conductive terminal of the reset transistor T9 changes from the second-level voltage to the first-level voltage during a period during which the reset transistor T9 is maintained in on state.

For the variant of the second embodiment, in the refresh frame period RF included in the driving period and the non-refresh frame period NRF included in the pause period, the emission driver 400 drives the i light-emission control lines EM(1) to EM(i) such that the first light-emission control transistor T5 and the second light-emission control transistor T6 change from off state to on state after a certain period has elapsed since the first light-emission control transistor T5 and the second light-emission control transistor T6 change from on state to off state. In addition, in the refresh frame period RF included in the driving period, the gate driver 300 drives the (i+2) first scanning signal lines NS(−1) to NS(i) such that the reset transistor T9 changes from off state to on state after the first light-emission control transistor T5 and the second light-emission control transistor T6 change from on state to off state; a voltage provided to the second conductive terminal of the reset transistor T9 changes from the second-level voltage to the first-level voltage during a period during which the reset transistor T9 is maintained in on state; the threshold voltage compensation transistor T2 changes from off state to on state after the reset transistor T9 changes from on state to off state; and the threshold voltage compensation transistor T2 changes from on state to off state before the first light-emission control transistor T5 and the second light-emission control transistor T6 change from off state to on state.

4. Others

Although the above-described embodiments and variants make a description using an organic EL display device as an example, the display device is not limited thereto. The above-described content of disclosure can also be applied to inorganic EL display devices, QLED display devices, etc., as long as the display devices use display elements driven by current.

DESCRIPTION OF REFERENCE CHARACTERS

20: PIXEL CIRCUIT
21: ORGANIC EL ELEMENT

22: RESET CIRCUIT
100: DISPLAY CONTROL CIRCUIT
200: DISPLAY UNIT
300: GATE DRIVER (SCANNING SIGNAL LINE DRIVE CIRCUIT)
400: EMISSION DRIVER (LIGHT-EMISSION CONTROL LINE DRIVE CIRCUIT)
500: SOURCE DRIVER (DATA SIGNAL LINE DRIVE CIRCUIT)
NS, NS(−1) to NS(i): FIRST SCANNING SIGNAL, FIRST SCANNING SIGNAL LINE
PS, PS(1) to PS(i): SECOND SCANNING SIGNAL, SECOND SCANNING SIGNAL LINE
EM: LIGHT-EMISSION CONTROL SIGNAL, LIGHT-EMISSION CONTROL LINE
N1: FIRST NODE (DRIVE CURRENT CONTROL NODE)
N2: SECOND NODE
T1: FIRST INITIALIZATION TRANSISTOR
T2: THRESHOLD VOLTAGE COMPENSATION TRANSISTOR
T3: WRITE CONTROL TRANSISTOR
T4: DRIVE TRANSISTOR
T5: FIRST LIGHT-EMISSION CONTROL TRANSISTOR
T6: SECOND LIGHT-EMISSION CONTROL TRANSISTOR
T7: SECOND INITIALIZATION TRANSISTOR
T8: OFF-VOLTAGE APPLICATION TRANSISTOR
T9: RESET TRANSISTOR
Cst: HOLDING CAPACITOR

The invention claimed is:

1. A pixel circuit provided in a display device that can operate in a pause driving mode in which a driving period and a pause period alternately appear, the driving period including one or a plurality of refresh frame periods during which writing of a data voltage is performed, and the pause period including one or a plurality of non-refresh frame periods during which writing of a data voltage is not performed, the pixel circuit comprising:

a display element configured to emit light at luminance determined based on an amount of a drive current supplied to the display element;

a drive transistor having a control terminal, a first conductive terminal, and a second conductive terminal and provided in series with the display element;

a drive current control node connected to the control terminal of the drive transistor;

a holding capacitor having one terminal connected to the drive current control node;

a write control transistor having a control terminal; a first conductive terminal to which a data voltage is provided; and a second conductive terminal connected to the first conductive terminal of the drive transistor;

a threshold voltage compensation transistor having a control terminal; a first conductive terminal connected to the second conductive terminal of the drive transistor; and a second conductive terminal connected to the drive current control node;

at least one light-emission control transistor having a control terminal, a first conductive terminal, and a second conductive terminal and provided in series with the display element and the drive transistor; and a reset circuit configured to provide an initialization voltage to the drive current control node after providing an off-voltage to the drive current control node, before the data voltage is provided to the drive current control node through the write control transistor, the drive transistor, and the threshold voltage compensation transistor, in a period, during which the at least one light-emission control transistor is maintained in off state, in a refresh frame period included in the driving period, the off-voltage bringing the drive transistor into off state, and the initialization voltage bringing the drive transistor into on state.

2. The pixel circuit according to claim 1, wherein the threshold voltage compensation transistor is an N-channel thin-film transistor, and the drive transistor, the write control transistor, and the at least one light-emission control transistor are P-channel thin-film transistors.

3. The pixel circuit according to claim 1- or 2, wherein the reset circuit includes:

an initialization circuit for providing the initialization voltage to the drive current control node; and an off-voltage application circuit for providing the off-voltage to the drive current control node.

4. The pixel circuit according to claim 3, wherein the initialization circuit includes a drive current control node initialization transistor having a control terminal; a first conductive terminal connected to the drive current control node; and a second conductive terminal to which the initialization voltage is provided, the off-voltage application circuit includes an off-voltage application transistor having a control terminal; a first conductive terminal to which a constant voltage is provided; and a second conductive terminal connected to the drive current control node, and in a refresh frame period included in the driving period, the constant voltage is provided as the off-voltage to the drive current control node by the off-voltage application transistor going into on state, and then the initialization voltage is provided to the drive current control node by the drive current control node initialization transistor going into on state.

5. The pixel circuit according to claim 3, wherein the initialization circuit includes a drive current control node initialization transistor having a control terminal; a first conductive terminal connected to the drive current control node; and a second conductive terminal to which the initialization voltage is provided, the off-voltage application circuit includes an off-voltage application transistor having a control terminal; a first conductive terminal to which a fist-level voltage that brings the write control transistor into on state and a second-level voltage that brings the write control transistor into off state are alternately applied; and a second conductive terminal connected to the drive current control node, the first conductive terminal being connected to the control terminal of the write control transistor, and in a refresh frame period included in the driving period, the second-level voltage is provided as the off-voltage to the drive current control node by the off-voltage application transistor going into on state, and then the initialization voltage is provided to the drive current control node by the drive current control node initialization transistor going into on state.

6. The pixel circuit according to claim 3, wherein the initialization circuit includes a drive current control node initialization transistor having a control terminal; a first conductive terminal connected to the drive current control node; and a second conductive terminal to which the initialization voltage is provided, the off-voltage application circuit includes an off-voltage application transistor having a control terminal; a first conductive terminal to which a power supply voltage for supplying a drive current to the display element is provided; and a second conductive terminal connected to the drive current control node, and in a refresh frame period included in the driving period, the power supply voltage is provided as the off-voltage to the drive current control node by the off-voltage application transistor going into on state, and then the initialization voltage is provided to the drive current control node by the drive current control node initialization transistor going into on state.

7. The pixel circuit according to claim 4, wherein the drive current control node initialization transistor and the off-voltage application transistor are N-channel thin-film transistors.

8. The pixel circuit according to claim 1- or 2, wherein the reset circuit includes a reset transistor having a control terminal; a first conductive terminal connected to the drive current control node; and a second conductive terminal to which a first-level voltage corresponding to the initialization voltage and a second-level voltage corresponding to the off-voltage are alternately provided, in a refresh frame period included in the driving period, the reset transistor is maintained in on state during a part of a period during which the at least one light-emission control transistor is maintained in off state, and a voltage provided to the second conductive terminal of the reset transistor changes from the second-level voltage to the first-level voltage in a period during which the reset transistor is maintained in on state, by which the first-level voltage is provided as the initialization voltage to the drive current control node after the second-level voltage is provided as the off-voltage to the drive current control node.

9. The pixel circuit according to claim 8, wherein the reset transistor is an N-channel thin-film transistor.

10. A display device comprising:

a display unit including a plurality of pixel circuits;

a display drive circuit configured to drive the plurality of pixel circuits; and a display control circuit configured to control the display drive circuit such that a driving period and a pause period alternately appear, the driving period including one or a plurality of refresh frame periods during which writing of data voltages to the plurality of pixel circuits is performed, and the pause period including one or a plurality of non-refresh frame periods during which writing of data voltages to the plurality of pixel circuits is not performed, wherein each of the plurality of pixel circuits includes:

a display element configured to emit light at luminance determined based on an amount of a drive current supplied to the display element;

a drive transistor having a control terminal, a first conductive terminal, and a second conductive terminal and provided in series with the display element;

a drive current control node connected to the control terminal of the drive transistor;

a holding capacitor having one terminal connected to the drive current control node;

a write control transistor having a control terminal; a first conductive terminal to which a data voltage is provided; and a second conductive terminal connected to the first conductive terminal of the drive transistor;

a threshold voltage compensation transistor having a control terminal; a first conductive terminal connected to the second conductive terminal of the drive transistor; and a second conductive terminal connected to the drive current control node;

at least one light-emission control transistor having a control terminal, a first conductive terminal, and a second conductive terminal and provided in series with the display element and the drive transistor; and a reset circuit configured to be able to provide an off-voltage and an initialization voltage to the drive current control node, the off-voltage bringing the drive transistor into off state, and the initialization voltage bringing the drive transistor into on state, and in a refresh frame period included in the driving period, the display control circuit controls the display drive circuit such that the initialization voltage is provided to the drive current control node by the reset circuit after the off-voltage is provided to the drive current control node by the reset circuit, before a data voltage is provided to the drive current control node through the write control transistor, the drive transistor, and the threshold voltage compensation transistor.

11. The display device according to claim 10, wherein the threshold voltage compensation transistor is an N-channel thin-film transistor, the drive transistor, the write control transistor, and the at least one light-emission control transistor are P-channel thin-film transistors, the display unit includes a plurality of data signal lines, a plurality of first scanning signal lines, a plurality of second scanning signal lines, and a plurality of light-emission control lines, the display drive circuit includes:

a data signal line drive circuit configured to apply data voltages to the plurality of data signal lines;

a scanning signal line drive circuit configured to drive the plurality of first scanning signal lines and the plurality of second scanning signal lines; and a light-emission control line drive circuit configured to drive the plurality of light-emission control lines, the control terminal of the write control transistor is connected to one of the plurality of second scanning signal lines, the first conductive terminal of the write control transistor is connected to one of the plurality of data signal lines, the control terminal of the threshold voltage compensation transistor is connected to one of the plurality of first scanning signal lines, the control terminal of the at least one light-emission control transistor is connected to one of the plurality of light-emission control lines, in a refresh frame period included in the driving period and a non-refresh frame period included in the pause period, the light-emission control line drive circuit drives the plurality of light-emission control lines such that the at least one light-emission control transistor changes from off state to on state after a certain period has elapsed since the at least one light-emission control transistor changes from on state to off state, and in a period, during which the at least one light-emission control transistor is maintained in off state, in a refresh frame period included in the driving period, the scanning signal line drive circuit drives the plurality of first scanning signal lines and the plurality of second scanning signal lines such that the threshold voltage compensation transistor changes from on state to off state after a certain period has elapsed since the threshold voltage compensation transistor changes from off state to on state and the write control transistor is maintained in on state during at least a part of a period during which the threshold voltage compensation transistor is maintained in on state.

12. The display device according to claim 11, wherein the reset circuit includes:

a drive current control node initialization transistor having a control terminal connected to one of the plurality of first scanning signal lines; a first conductive terminal connected to the drive current control node; and a second conductive terminal to which the initialization voltage is provided, the drive current control node initialization transistor being an N-channel thin-film transistor; and an off-voltage application transistor having a control terminal connected to one of the plurality of first scanning signal lines; a first conductive terminal; and a second conductive terminal connected to the drive current control node, the off-voltage application transistor being an N-channel thin-film transistor, a first scanning signal line connected to the control terminal of the threshold voltage compensation transistor, a first scanning signal line connected to the control terminal of the drive current control node initialization transistor, and a first scanning signal line connected to the control terminal of the off-voltage application transistor are different from each other, in a refresh frame period included in the driving period, the scanning signal line drive circuit drives the plurality of first scanning signal lines such that the off-voltage application transistor changes from off state to on state after the at least one light-emission control transistor changes from on state to off state; the drive current control node initialization transistor changes from off state to on state after the off-voltage application transistor changes from on state to off state; the threshold voltage compensation transistor changes from off state to on state after the drive current control node initialization transistor changes from on state to off state; and the threshold voltage compensation transistor changes from on state to off state before the at least one light-emission control transistor changes from off state to on state, and during a period during which the off-voltage application transistor is maintained in on state, the first conductive terminal of the off-voltage application transistor is provided with the off-voltage.

13. The display device according to claim 12, wherein the first conductive terminal of the off-voltage application transistor is provided with a control voltage as the off-voltage.

14. The display device according to claim 12, wherein one of the plurality of second scanning signal lines is connected to the first conductive terminal of the off-voltage application transistor, and the scanning signal line drive circuit drives the plurality of first scanning signal lines such that the off-voltage is provided to the first conductive terminal of the off-voltage application transistor during a period during which the off-voltage application transistor is maintained in on state.

15. The display device according to claim 12, wherein the first conductive terminal of the off-voltage application transistor is provided with a power supply voltage for supplying a drive current to the display element, as the off-voltage.

16. The display device according to claim 11, wherein the display unit includes a plurality of reset control signal lines to which a first-level voltage corresponding to the initialization voltage and a second-level voltage corresponding to the off-voltage are alternately applied, the display drive circuit includes a reset control signal line drive circuit configured to drive the plurality of reset control signal lines, the reset circuit includes a reset transistor having a control terminal connected to one of the plurality of first scanning signal lines; a first conductive terminal connected to the drive current control node; and a second conductive terminal connected to one of the plurality of reset control signal lines, the reset transistor being an N-channel thin-film transistor, a first scanning signal line connected to the control terminal of the threshold voltage compensation transistor and a first scanning signal line connected to the control terminal of the reset transistor are different from each other, in a refresh frame period included in the driving period and a non-refresh frame period included in the pause period, the light-emission control line drive circuit drives the plurality of light-emission control lines such that the at least one light-emission control transistor changes from off state to on state after a certain period has elapsed since the at least one light-emission control transistor changes from on state to off state, in a refresh frame period included in the driving period, the scanning signal line drive circuit drives the plurality of first scanning signal lines such that the reset transistor changes from off state to on state after the at least one light-emission control transistor changes from on state to off state; the threshold voltage compensation transistor changes from off state to on state after the reset transistor changes from on state to off state; and the threshold voltage compensation transistor changes from on state to off state before the at least one light-emission control transistor changes from off state to on state, and in a refresh frame period included in the driving period, the reset control signal line drive circuit drives the plurality of reset control signal lines such that a voltage provided to the second conductive terminal of the reset transistor changes from the first-level voltage to the second-level voltage after the at least one light-emission control transistor changes from on state to off state; and the voltage provided to the second conductive terminal of the reset transistor changes from the second-level voltage to the first-level voltage during a period during which the reset transistor is maintained in on state.

17. The display device according to claim 11, wherein the reset circuit includes a reset transistor having a control terminal connected to one of the plurality of first scanning signal lines; a first conductive terminal connected to the drive current control node; and a second conductive terminal connected to one of the plurality of first scanning signal lines, the reset transistor being an N-channel thin-film transistor, a first scanning signal line connected to the control terminal of the threshold voltage compensation transistor, a first scanning signal line connected to the control terminal of the reset transistor, and a first scanning signal line connected to the second conductive terminal of the reset transistor are different from each other, the scanning signal line drive circuit alternately applies a first-level voltage corresponding to the initialization voltage and a second-level voltage corresponding to the off-voltage to each of the plurality of first scanning signal lines, in a refresh frame period included in the driving period and a non-refresh frame period included in the pause period, the light-emission control line drive circuit drives the plurality of light-emission control lines such that the at least one light-emission control transistor changes from off state to on state after a certain period has elapsed since the at least one light-emission control transistor changes from on state to off state, and in a refresh frame period included in the driving period, the scanning signal line drive circuit drives the plurality of first scanning signal lines such that the reset transistor changes from off state to on state after the at least one light-emission control transistor changes from on state to off state; a voltage provided to the second conductive terminal of the reset transistor changes from the second-level voltage to the first-level voltage during a period during which the reset transistor is maintained in on state; the threshold voltage compensation transistor changes from off state to on state after the reset transistor changes from on state to off state; and the threshold voltage compensation transistor changes from on state to off state before the at least one light-emission control transistor changes from off state to on state.

18. A method of driving a display device including a plurality of pixel circuits, wherein each of the plurality of pixel circuits includes:

a display element configured to emit light at luminance determined based on an amount of a drive current supplied to the display element;

a drive transistor having a control terminal, a first conductive terminal, and a second conductive terminal and provided in series with the display element;

a drive current control node connected to the control terminal of the drive transistor;

a holding capacitor having one terminal connected to the drive current control node;

a write control transistor having a control terminal; a first conductive terminal to which a data voltage is provided; and a second conductive terminal connected to the first conductive terminal of the drive transistor;

a threshold voltage compensation transistor having a control terminal; a first conductive terminal connected to the second conductive terminal of the drive transistor; and a second conductive terminal connected to the drive current control node; and at least one light-emission control transistor having a control terminal, a first conductive terminal, and a second conductive terminal and provided in series with the display element and the drive transistor, the method comprises a pause driving step of driving the plurality of pixel circuits such that a driving period and a pause period alternately appear, the driving period including one or a plurality of refresh frame periods during which writing of data voltages to the plurality of pixel circuits is performed, and the pause period including one or a plurality of non-refresh frame periods during which writing of data voltages to the plurality of pixel circuits is not performed, and the pause driving step includes:

a light-emission stopping step of changing the at least one light-emission control transistor from on state to off state in a refresh frame period included in the driving period;

an off-voltage applying step of providing an off-voltage to the drive current control node after the light-emission stopping step, the off-voltage bringing the drive transistor into off state;

an initializing step of providing an initialization voltage to the drive current control node after the off-voltage applying step, the initialization voltage bringing the drive transistor into on state;

a data voltage writing step of providing a data voltage to the drive current control node through the write control transistor, the drive transistor, and the threshold voltage compensation transistor after the initializing step; and a light-emission resuming step of changing the at least one light-emission control transistor from off state to on state after the data voltage writing step.

19. The method according to claim 18, wherein each of the plurality of pixel circuits includes:

a drive current control node initialization transistor having a control terminal; a first conductive terminal connected to the drive current control node; and a second conductive terminal to which the initialization voltage is provided; and an off-voltage application transistor having a control terminal; a first conductive terminal; and a second conductive terminal connected to the drive current control node, in the off-voltage applying step, a voltage provided to the control terminal of the off-voltage application transistor is controlled such that the off-voltage application transistor changes from off state to on state, with the first conductive terminal of the off-voltage application transistor being provided with the off-voltage, and in the initializing step, a voltage provided to the control terminal of the drive current control node initialization transistor is controlled such that the drive current control node initialization transistor changes from off state to on state.

20. The method according to claim 18, wherein each of the plurality of pixel circuits includes a reset transistor having a control terminal; a first conductive terminal connected to the drive current control node; and a second conductive terminal to which a first-level voltage corresponding to the initialization voltage and a second-level voltage corresponding to the off-voltage are alternately provided, in the off-voltage applying step, a voltage provided to the control terminal of the reset transistor is controlled such that the reset transistor changes from off state to on state, with the second conductive terminal of the reset transistor being provided with the second-level voltage, and in the initializing step, the reset transistor is maintained in on state, and the first-level voltage is provided to the second conductive terminal of the reset transistor.

* * * * *